US008086587B2

United States Patent
Obana et al.

(10) Patent No.: US 8,086,587 B2
(45) Date of Patent: Dec. 27, 2011

(54) INFORMATION PROCESSING APPARATUS, METHOD, AND PROGRAM

(75) Inventors: Michimasa Obana, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 198 days.

(21) Appl. No.: 12/408,836

(22) Filed: Mar. 23, 2009

(65) Prior Publication Data

US 2009/0259653 A1 Oct. 15, 2009

(30) Foreign Application Priority Data

Apr. 15, 2008 (JP) .................................. 2008-105502

(51) Int. Cl.
G06F 17/30 (2006.01)

(52) U.S. Cl. ........................................ 707/705
(58) Field of Classification Search ........................ None
See application file for complete search history.

(56) References Cited

U.S. PATENT DOCUMENTS

| 6,621,917 B1* | 9/2003 | Vilser ............................ 382/128 |
| 2001/0004739 A1* | 6/2001 | Sekiguchi et al. ............ 707/100 |
| 2001/0046321 A1* | 11/2001 | Murakawa ..................... 382/190 |
| 2002/0069218 A1* | 6/2002 | Sull et al. ..................... 707/501.1 |
| 2004/0075645 A1* | 4/2004 | Taylor et al. ................... 345/157 |
| 2007/0201769 A1 | 8/2007 | Node et al. |
| 2008/0313140 A1* | 12/2008 | Pereira et al. ...................... 707/2 |

FOREIGN PATENT DOCUMENTS

JP 2007-235374 9/2007

* cited by examiner

*Primary Examiner* — Mohammad Ali
*Assistant Examiner* — Syed H Hasan
(74) *Attorney, Agent, or Firm* — Oblon, Spivak, McClelland, Maier & Neustadt, L.L.P.

(57) ABSTRACT

An information processing apparatus searches search target frame images in video data to find a frame image matching a search query frame image. An extractor extracts characteristic quantities expressing the characteristics of respective images. A reliability judge judges the reliability of the values of each characteristic quantity in a characteristic quantity group extracted from the search query frame. If certain characteristic quantity values in the search query frame are judged to be of low reliability, the converter converts those values into predetermined values. Values are similarly converted for all search target frames. A comparer compares the converted characteristic quantities in the search query frame to the converted characteristic quantities in all search target frames. On the basis of the comparisons, a decision unit then chooses a search solution frame that matches the search query frame. In so doing, search processing robustness with respect to data variance is improved.

17 Claims, 17 Drawing Sheets

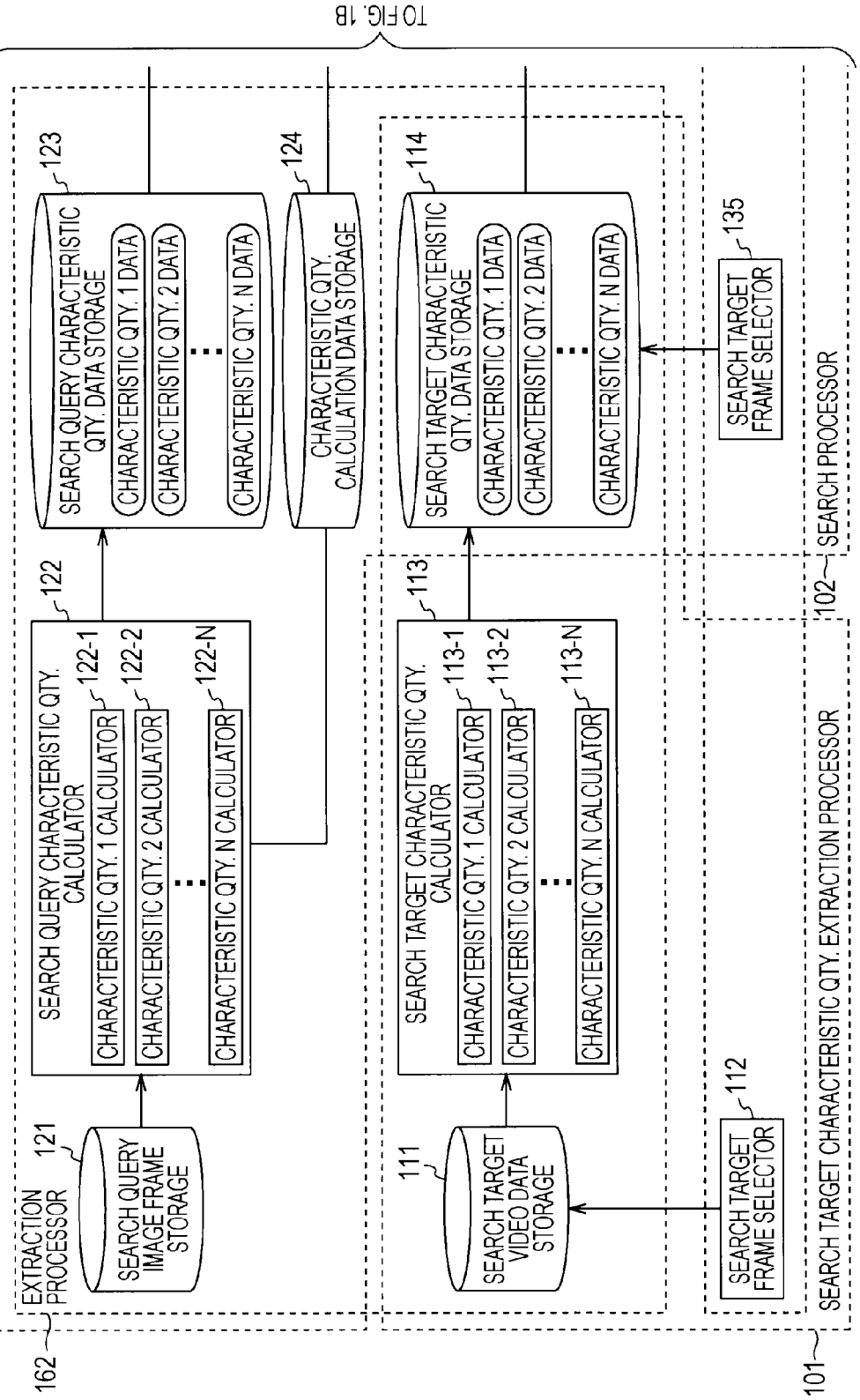

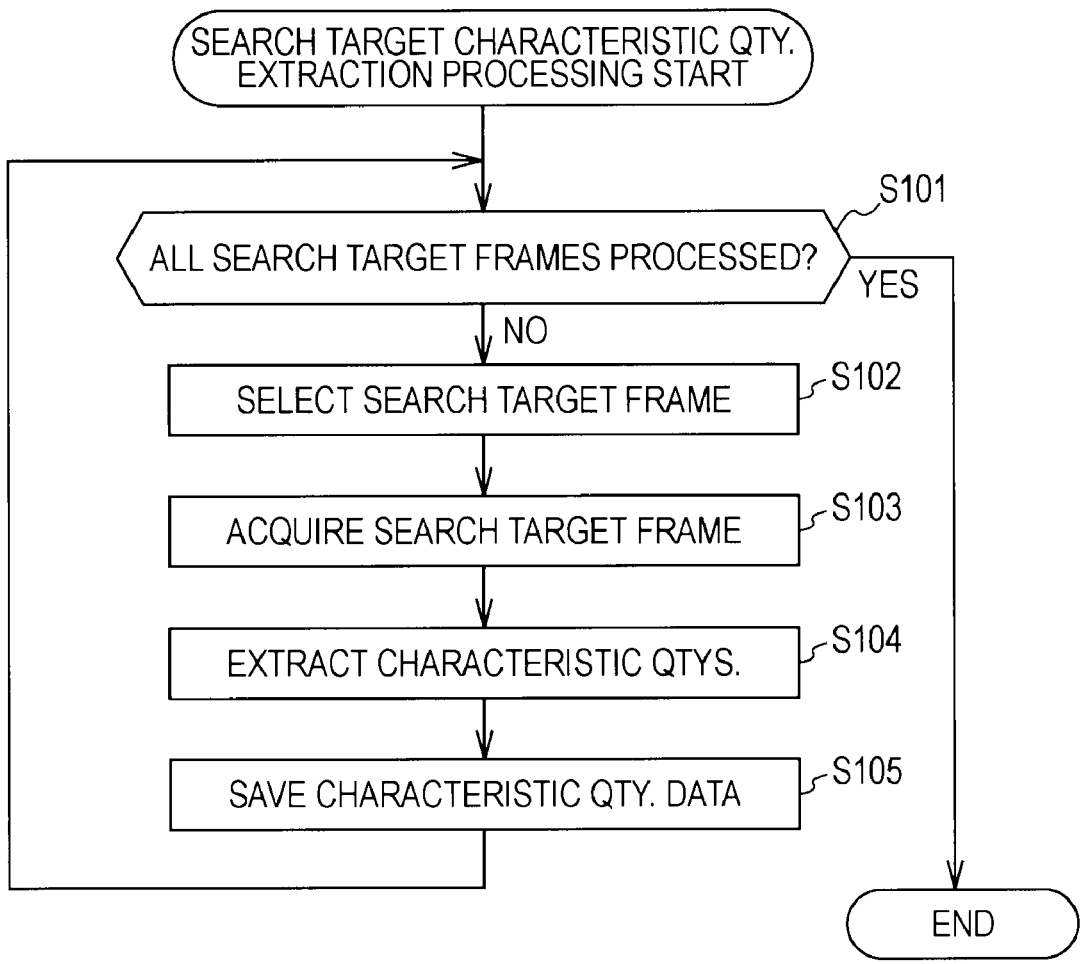

INFORMATION PROCESSING APPARATUS, METHOD, AND PROGRAM

BACKGROUND OF THE INVENTION

1. Field of the Invention

The present invention relates to an information processing apparatus, method and program. More particularly, the present invention relates to an information processing apparatus, method, and program whereby search processing robustness with respect to data variance is improved.

2. Description of the Related Art

In the related art, there exists image frame search technology whereby video is searched for a desired frame image on the basis of image characteristics (see Japanese Unexamined Patent Application Publication No. 2007-235374, for example). An information processing apparatus conducting such frame searches may, for example, accumulate in advance certain characteristics of a desired frame image that acts as the search query, compare the characteristics with those of individual frame images contained in video data that acts as the search target, and then take the search results to be the one or more frame images having characteristics that match those of the desired frame image.

SUMMARY OF THE INVENTION

However, since such searches are conducted on the basis of characteristic quantities obtained from image data, results might not be returned if the search query frame image and the search target frame image are not of a common data lineage. In other words, the search target video data is searched for a frame image therein that matches the search query frame image bit-for-bit. For this reason, as disclosed in JP-A-2007-235374, if noise filtering or image quality adjustments have been performed with respect to the search target image data, for example, then the search query and search target image data might not match when a search is performed and thereby cause the search to fail, even in the case where the search target image data was identical to the search query image data prior to being processed.

Given the above, a method is also conceivable wherein a search is conducted for the frame image that most closely matches the characteristics of the search query frame image, for example. However, the frame image characteristics may also change due to data variance caused by factors such as signal degradation and image quality adjustments. In other words, as a result of such change in characteristics, the characteristics of a frame image other than the frame image originally identical with the search query frame image might be found to most closely match the characteristics of the search query frame image, and thus result in inaccurate searches.

Being devised in light of the foregoing problems, the present invention improves search processing robustness with respect to data variance occurring as a result of factors such as noise filtering and image processing, and thereby enables more consistent and accurate searches to be conducted.

An information processing apparatus in accordance with an embodiment of the present invention includes the following. Extracting means extracts a plurality of characteristic quantities in the form of parameters that express the respective characteristics of respective images, the images being a search query frame in the form of a frame image that acts as the basis for the search, and a plurality of search target frames in the form of frame images from video data that acts as the target of the search. Reliability judging means judges the reliability of the values of each characteristic quantity in a search query frame characteristic quantity group that was extracted by the extracting means. Converting means converts, into predetermined values, the values of characteristic quantities in the search query frame characteristic quantity group that were judged to be values of low reliability by the reliability judging means, as well as the values of the characteristic quantities in all search target frame characteristic quantity groups that correspond to the characteristic quantities judged to be values of low reliability by the reliability judging means. Comparing means compares individual characteristic quantities in the search query frame characteristic quantity group and all search target frame characteristic quantity groups whose values were converted by the converting means. Deciding means chooses, on the basis of the results of the comparisons conducted by the comparing means, a search solution frame that matches the search query frame.

The extracting means may also define a characteristic quantity by normalizing values expressing a characteristic of an image into binary values on the basis of a predetermined threshold value. The reliability judging means may then judge the value of a characteristic quantity to be of low reliability in the case where the pre-normalization value expressing a characteristic of the image is included in a predetermined range centered about the threshold value.

The threshold value may be defined to be an intermediate value between the maximum value and the minimum value of the pre-normalization values expressing a characteristic of the image.

The converting means may also convert, into either value of the binary value, the values of characteristic quantities in the search query frame characteristic quantity group that were judged to be values of low reliability by the reliability judging means, as well as the values of the characteristic quantities in all search target frame characteristic quantity groups that correspond to the characteristic quantities judged to be values of low reliability by the reliability judging means.

The extracting means may also extract a plurality of characteristic quantity groups made up of different categories of characteristic quantities from the search query frame and all search target frames, respectively. The reliability judging means may then judge the reliability of the values of each characteristic quantity in each respective characteristic quantity group in the plurality of characteristic quantity groups that were extracted by the extracting means. Then, for each respective characteristic quantity group in the plurality of characteristic quantity groups, the converting means may convert the values of characteristic quantities that were judged to be values of low reliability by the reliability judging means, or alternatively, the values of all characteristic quantities that correspond to the characteristic quantities judged to have values of low reliability by the reliability judging means. The comparing means may then compare respective characteristic quantity groups from the plurality of characteristic quantity groups. On the basis of the results of the comparisons of individual characteristic quantity groups conducted by the comparing means, the deciding means may then designate the search solution frame to be the frame that matches the search query frame in all categories.

The extracting means may define a first characteristic quantity by extracting a vector of statistical quantities related to the brightness values of each of a plurality of blocks into which an entire image has been divided. The extracting may define a second characteristic quantity by extracting a vector of statistical quantities related to the absolute values of the interframe differences in the brightness values for two successive frames on a per-block basis.

The extracting means may also define a third characteristic quantity by furthermore extracting a vector of statistical quantities related to the absolute values of the interframe differences in the above statistical quantities related to the absolute values of the interframe differences in the brightness values for two successive frames on a per-block basis.

An information processing method in accordance with another embodiment of the present invention includes the steps of: extracting a plurality of characteristic quantities in the form of parameters that express the respective characteristics of respective images, the images being a search query frame in the form of a frame image that acts as the basis for the search, and a plurality of search target frames in the form of frame images from video data that acts as the target of the search; judging the reliability of the values of each characteristic quantity in a search query frame characteristic quantity group that was extracted in the extracting step; converting, into predetermined values, the values of characteristic quantities in the search query frame characteristic quantity group that were judged to be values of low reliability in the reliability judging step, as well as the values of the characteristic quantities in all search target frame characteristic quantity groups that correspond to the characteristic quantities judged to be values of low reliability in the reliability judging step; comparing individual characteristic quantities in the search query frame characteristic quantity group and all search target frame characteristic quantity groups whose values were converted in the converting step; and choosing, on the basis of the results of the comparisons conducted in the comparing step, a search solution frame that matches the search query frame.

A program in accordance with another embodiment of the present invention causes a computer execute the steps of: extracting a plurality of characteristic quantities in the form of parameters that express the respective characteristics of respective images, the images being a search query frame in the form of a frame image that acts as the basis for the search, and a plurality of search target frames in the form of frame images from video data that acts as the target of the search; judging the reliability of the values of each characteristic quantity in a search query frame characteristic quantity group that was extracted in the extracting step; converting, into predetermined values, the values of characteristic quantities in the search query frame characteristic quantity group that were judged to be values of low reliability in the reliability judging step, as well as the values of the characteristic quantities in all search target frame characteristic quantity groups that correspond to the characteristic quantities judged to be values of low reliability in the reliability judging step; comparing individual characteristic quantities in the search query frame characteristic quantity group and all search target frame characteristic quantity groups whose values were converted in the converting step; and choosing, on the basis of the results of the comparisons conducted in the comparing step, a search solution frame that matches the search query frame.

In an embodiment of the present invention, a plurality of characteristic quantities in the form of parameters that express the respective characteristics of respective images are extracted, the images being a search query frame in the form of a frame image that acts as the basis for the search, and a plurality of search target frames in the form of frame images from video data that acts as the target of the search. The reliability of the values of each characteristic quantity in a search query frame characteristic quantity group that were extracted is then judged. The values of characteristic quantities in the search query frame characteristic quantity group that were judged to be values of low reliability, as well as the values of the characteristic quantities in all search target frame characteristic quantity groups that correspond to the characteristic quantities judged to be values of low reliability, are then converted into predetermined values. The individual characteristic quantities in the search query frame characteristic quantity group and all search target frame characteristic quantity groups whose values were converted are then compared. On the basis of the results of the comparisons, a search solution frame that matches the search query frame is then chosen.

Thus, according to an embodiment of the present invention, search processing is conducted. More particularly, search processing robustness with respect to data variance is improved.

BRIEF DESCRIPTION OF THE DRAWINGS

FIG. 2 is a flowchart explaining an exemplary process flow for search target characteristic quantity extraction processing;

DESCRIPTION OF THE PREFERRED EMBODIMENTS

Figure 1B:
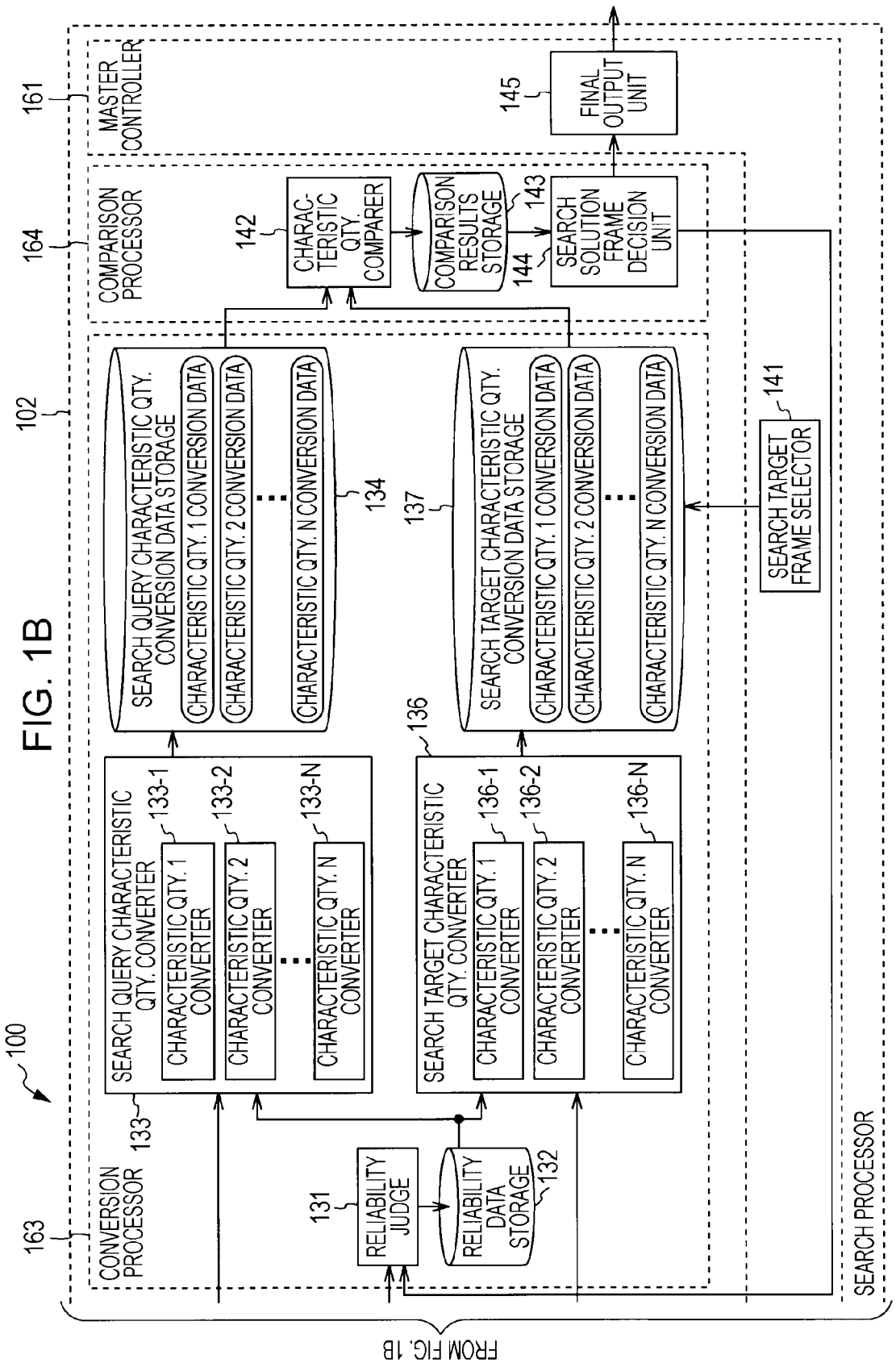
FIG. 1 is a block diagram illustrating an exemplary principal configuration of a frame search device to which an embodiment of the present invention has been applied.

FIG. 1 is a block diagram illustrating an exemplary principal configuration of a frame search device to which an embodiment of the present invention has been applied. The frame search device 100 shown in FIG. 1 searches search target video for frame images therein that match a search query frame image. The frame search device 100 searches for a frame image that matches the search query by comparing frame image characteristics in the search query and the search target.

An image contains not only a picture, but also a variety of parameters, such as brightness, hue, sharpness, and noise level. For this reason, it is typically difficult to properly evaluate an image on the basis of a single criterion. Furthermore, in the case of video, there may exist a plurality of frame images with identical pictures, and thus a plurality of frame images may be matched to the search query frame image. Consequently, the frame search device 100 compares a plurality of characteristic quantities in order to more accurately conduct frame image searches.

In addition, match judgment may become inaccurate in the case where frame image characteristics change as a result of data variance caused by factors such as signal degradation and image quality adjustment. Consequently, the frame search device 100 also judges the reliability of computed frame image characteristics, and then searches for frames using the characteristic quantity data least likely to have been affected by data variance caused by factors such as signal degradation and picture quality adjustments.

In the description hereinafter, video is assumed to be progressive scan video and is herein processed in units of frame images. However, it should be appreciated as obvious that interlaced video may also be processed, in units of fields. The description hereinafter can be applied to such a case by substituting "frame images" with "field images" in the following.

First, the configuration of the frame search device 100 will be described. As shown in FIG. 1, the frame search device 100 includes a search target characteristic quantity extraction processor 101 that extracts the characteristic quantities of individual frame images from video data provided as the search target, as well as a search processor 102 that searches frame images.

The search target characteristic quantity extraction processor 101 includes search target video data storage 111, a search target frame selector 112, a search target characteristic quantity calculator 113, and search target characteristic quantity data storage 114.

The search target video data storage 111 may include a storage medium such as a hard disk or flash memory, for example, and stores search target video data, being video data provided as the frame image search target (i.e., the set of frame images to be searched for matches to the search query frame image). The search target frame selector 112 selects a frame image from which to extract characteristic quantities from among the search target video data stored in the search target video data storage 111. The search target video data storage 111 then supplies the image data for the frame image selected by the search target frame selector 112 to the search target characteristic quantity calculator 113.

The search target characteristic quantity calculator 113 includes N (where N is a natural number) characteristic quantity calculators (i.e., a characteristic quantity 1 calculator 113-1, a characteristic quantity 2 calculator 113-2, ..., and a characteristic quantity N calculator 113-N). Given an input frame image, the respective characteristic quantity calculators calculate mutually different characteristic quantities for that frame image. In other words, the characteristic quantity 1 calculator 113-1 calculates a predetermined characteristic quantity 1 for the frame image, the characteristic quantity 2 calculator 113-2 calculates a predetermined characteristic quantity 2 for the frame image that differs from the characteristic quantity 1, and the characteristic quantity N calculator 133-N calculates a predetermined characteristic quantity N for the frame image that differs from both the characteristic quantity 1 and the characteristic quantity 2. The search target characteristic quantity calculator 113 then supplies the N characteristic quantities computed as above to the search target characteristic quantity data storage 114.

In other words, the search target characteristic quantity calculator 113 computes one or more characteristic quantities. It should be appreciated that the number of different characteristic quantities computed by the search target characteristic quantity calculator 113 is arbitrary, and may be one characteristic quantity or a plurality of characteristic quantities. However, if the search target characteristic quantity calculator 113 computes a larger number of different characteristic quantities, then the frame search device 100 is able to conduct searches using that larger number of characteristic quantities, and thus frame searches are typically more accurate. On the other hand, the load on the characteristic quantity calculator is also increased to an equivalent degree, and thus it is not desirable to compute more characteristic quantities than is appropriate.

The search target characteristic quantity data storage 114 includes a storage medium such as a hard disk or flash memory, for example, and stores the supplied N characteristic quantities for each corresponding frame image.

The search processor 102 includes search query image frame storage 121, a search query characteristic quantity calculator 122, search query characteristic quantity data storage 123, characteristic quantity calculation data storage 124, a reliability judge 131, reliability data storage 132, a search query characteristic quantity converter 133, search query characteristic quantity conversion data storage 134, a search target frame selector 135, a search target characteristic quantity converter 136, search target characteristic quantity conversion data storage 137, a search target frame selector 141, a characteristic quantity comparer 142, comparison results storage 143, a search solution frame decision unit 144, and a final output unit 145.

The search query image frame storage 121 includes a storage medium such as a hard disk or flash memory, for example, and stores data representing the frame image provided as the search query. Since the search query (i.e., the basis of the search) herein is a single frame image, the search query image frame storage 121 stores at least the data representing the frame image provided as the search query.

However, the search target video data described hereinafter is assumed to be data that has been subjected to processes such as filtering for noise caused by signal degradation, and image quality adjustment. Meanwhile, the search query frame image is herein assumed to be a frame image that was extracted from the video data before such noise filtering and image quality adjustment were conducted. In other words, the search query image frame storage 121 stores video data, and a frame image extracted from that video data is herein taken to be the search query frame image. At this point, video data stored in the search query image frame storage 121 may then be subjected to processes such as noise filtering and image quality adjustment, with the resulting video data being stored in the search target video data storage 111 as the search target video data.

When appropriate, the search query image frame storage 121 extracts a search query frame image from the video data stored therein, and then supplies the extracted search query frame image to the search query characteristic quantity calculator 122.

The search query characteristic quantity calculator 122 computes characteristic quantities of the same type as those computed by the search target characteristic quantity calculator 113. In other words, the search query characteristic quantity calculator 122 includes N (where N is a natural number) characteristic quantity calculators (i.e., a characteristic quantity 1 calculator 122-1, a characteristic quantity 2 calculator 122-2, . . . , and a characteristic quantity N calculator 122-N). Given an input search query frame image, the respective characteristic quantity calculators calculate mutually different characteristic quantities for that search query frame image.

Thus, the characteristic quantity 1 calculator 122-1 corresponds to the characteristic quantity 1 calculator 113-1, and calculates a characteristic quantity 1. The characteristic quantity 2 calculator 122-2 corresponds to the characteristic quantity 2 calculator 113-2, and calculates a characteristic quantity 2. The characteristic quantity N calculator 122-N corresponds to the characteristic quantity N calculator 113-N, and calculates a characteristic quantity N. The search query characteristic quantity calculator 122 then supplies the N characteristic quantities computed as above to the search query characteristic quantity data storage 123.

The search query characteristic quantity data storage 123 includes a storage medium such as a hard disk or flash memory, for example. The search query characteristic quantity data storage 123 stores the N characteristic quantities supplied thereto, and as appropriate, supplies stored characteristic quantities to the search query characteristic quantity converter 133.

The characteristic quantity calculation data storage 124 acquires and stores characteristic quantity calculation data, being intermediate values obtained during the calculation of characteristic quantities by the search query characteristic quantity calculator 122. The characteristic quantity calculation data storage 124 supplies the characteristic quantity calculation data to the reliability judge 131 as appropriate.

The reliability judge 131 acquires, from the characteristic quantity calculation data storage 124, characteristic quantity calculation data expressing the content of the calculations conducted by the search query characteristic quantity calculator 122. On the basis of the characteristic quantity calculation data, the reliability judge 131 judges whether or not the characteristic quantities of the search query frame image stored in the search query characteristic quantity data storage 123 are reliable. The reliability judge 131 then supplies judgment results in the form of reliability data to the reliability data storage 132. The reliability data storage 132 includes a storage medium such as a hard disk or flash memory, for example. The reliability data storage 132 stores reliability data supplied thereto, and as appropriate, supplies stored reliability data to the search query characteristic quantity converter 133 and the search target characteristic quantity converter 136.

The search query characteristic quantity converter 133 acquires search query frame image characteristic quantities stored in the search query characteristic quantity data storage 123, and in accordance with reliability data acquired from the reliability data storage 132, converts individual characteristic quantities into reliable data, and then supplies the converted characteristic quantities to the search query characteristic quantity conversion data storage 134.

The search query characteristic quantity conversion data storage 134 includes a storage medium such as a hard disk or flash memory, for example. The search query characteristic quantity conversion data storage 134 stores the N converted characteristic quantities supplied thereto, and as appropriate, supplies stored characteristic quantities to the characteristic quantity comparer 142.

The search target frame selector 135 selects characteristic quantities stored in the search target characteristic quantity data storage 114 on a per-frame image basis. The search target characteristic quantity data storage 114 then supplies all characteristic quantities for the frame image selected by the search target frame selector 135 to the search target characteristic quantity converter 136.

The search target characteristic quantity converter 136 acquires the search target frame image characteristic quantities that were acquired from the search target characteristic quantity data storage 114, and in accordance with reliability data acquired from the reliability data storage 132, converts individual characteristic quantities into data of high reliability. The search target characteristic quantity converter 136 then supplies the converted characteristic quantities to the search target characteristic quantity conversion data storage 137.

The search target characteristic quantity conversion data storage 137 includes a storage medium such as a hard disk or flash memory, for example. The search target characteristic quantity conversion data storage 137 stores the N converted characteristic quantities supplied thereto, and as appropriate, supplies the characteristic quantities of a frame image selected by the search target frame selector 141 to the characteristic quantity comparer 142.

The characteristic quantity comparer 142 compares the characteristic quantity conversion data acquired from the search query characteristic quantity conversion data storage 134 and the search target characteristic quantity conversion data storage 137, and then outputs the comparison results to the comparison results storage 143.

The comparison results storage 143 includes a storage medium such as a hard disk or flash memory, for example. The comparison results storage 143 stores comparison results supplied thereto, and as appropriate, supplies stored comparison results to the search solution frame decision unit 144.

The search solution frame decision unit 144 acquires characteristic quantity comparison results from the comparison results storage 143, and on the basis thereof, chooses one or more search solution frames as the image frame matching results. In the case where a single frame image is chosen as the search solution frame, the search solution frame decision unit 144 issues a notification indicating the above to the final output unit 145. The final output unit 145 then outputs information regarding the frame image chosen as the search solution frame as outbound information from the frame search device 100.

In the case where a search solution frame is not chosen (i.e., the case where the search solution frame is not refined to a single frame image, or alternatively, the case where a frame image suitable as the search solution frame does not exist), the search solution frame decision unit 144 issues a notification indicating the above to the reliability judge 131. The reliability judge 131 then adjusts the reliability judgment criteria on the basis of the received information. The details of the above adjustment will be described later.

Herein, the search target frame selector 112, the search target frame selector 135, the search target frame selector 141, and the final output unit 145 described above are collectively referred to as the master controller 161. In addition, the search target video data storage 111, the search target characteristic quantity calculator 113, the search target characteristic quantity data storage 114, the search query image frame storage 121, the search query characteristic quantity calculator 122, the search query characteristic quantity data storage 123, and the characteristic quantity calculation data storage 124 are collectively referred to as the extraction processor 162. Furthermore, the reliability judge 131, the reliability data storage 132, the search query characteristic quantity converter 133, the search query characteristic quantity conversion data storage 134, the search target characteristic quantity converter 136, and the search target characteristic quantity conversion data storage 137 are collectively referred to as the conversion processor 163. The characteristic quantity comparer 142, the comparison results storage 143, and the search solution frame decision unit 144 are collectively referred to as the comparison processor 164.

Process flows will now be described. First, an exemplary process flow for search target characteristic quantity extraction processing conducted by the search target characteristic quantity extraction processor 101 will be described with reference to the flowchart shown in FIG. 2. Search target characteristic quantity extraction processing is initiated separately from and prior to the search processing wherein the search query and the search target are compared, and is initiated on the basis of user instructions or similar input, for example.

Upon initiation of the search target characteristic quantity extraction processing, the search target frame selector 112 first determines in step S101 whether or not all search target frames have been processed, the search target frames herein being frame images from the video data stored in the search target video data storage 111 and provided as the search target. If it is determined that unprocessed search target frames exist, then in step S102 the search target frame selector 112 selects, from among the video data, a frame image to act as the current search target frame. Principally, the search target frame selector 112 selects a frame image for the current search target frame by following the time sequence of the video. However, the selection sequence herein is arbitrary, and a selection sequence other than the above may also be used.

After selecting a search target frame, in step S103 the search target characteristic quantity calculator 113 acquires the search target frame, and in step S104, extracts N characteristic quantities from that search target frame. In step S105, the search target characteristic quantity data storage 114 saves and manages the extracted N characteristic quantities on a per-frame image basis.

Upon completion of the processing in step S105, the process returns to step S101. The respective processes in steps S101 to S105 above are then repeated and executed with respect to each frame image of the video data stored in the search target video data storage 111. The characteristic quantities of each frame image are thus extracted and accumulated in the search target characteristic quantity data storage 114.

When the processing is repeated as above and it is eventually determined in step S101 that all search target frames have been processed, the search target frame selector 112 terminates the search target characteristic quantity extraction processing.

Thus, as described above, the search target characteristic quantity extraction processor 101 is able to extract characteristic quantities from search target frame images.

Figure 3:
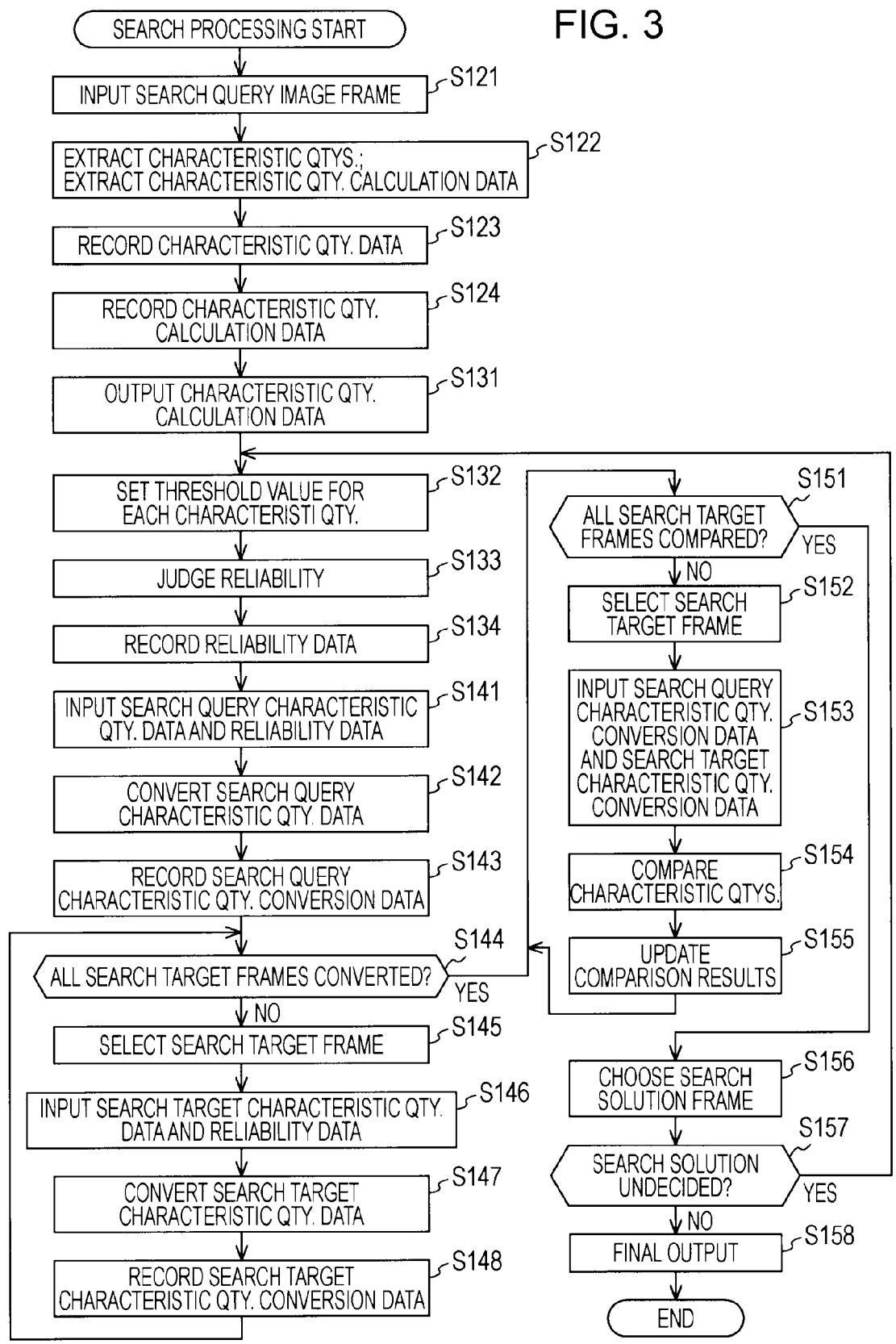
FIG. 3 is a flowchart explaining an exemplary process flow for search processing.

Next, an exemplary process flow for search processing executed by the search processor 102 shown in FIG. 1 will be described with reference to the flowchart shown in FIG. 3. Search processing is initiated as a result of the user selecting a frame image to act as the search query, for example.

Once a search query frame image is designated and search processing is initiated, in step S121 the search query characteristic quantity calculator 122 acquires, from the search query image frame storage 121, the frame image that was selected as the search query frame image by the user or other means. In step S122, N characteristic quantities (i.e., N sets of characteristic quantity data) are extracted from the search query frame image. In addition, the search query characteristic quantity calculator 122 also extracts characteristic quantity calculation data used in intermediate calculations to derive the characteristic quantities.

In step S123, the search query characteristic quantity data storage 123 stores (i.e., records) the extracted characteristic quantity data. In step S124, the characteristic quantity calculation data storage 124 stores (i.e., records) the extracted characteristic quantity calculation data.

Upon completion of the processing in step S124, the process proceeds to step S131, wherein processing related to judging the reliability of individual characteristic quantities with respect to signal degradation or other factors is conducted.

In step S131, the characteristic quantity calculation data storage 124 outputs stored characteristic quantity calculation data at predetermined timings and supplies the output data to the reliability judge 131. In step S132, the reliability judge 131 sets a threshold value for each characteristic quantity (more specifically, for each set of characteristic quantity calculation data). The threshold values herein are used to distinguish whether or not a given characteristic quantity is reliable with respect to signal degradation or other factors. At this point, when the reliability judge 131 makes reliability judgments with respect to the characteristic quantity calculation data for the second time and thereafter, the reliability judge 131 also incorporates search solution frame decision results when setting a threshold value.

In step S133, the reliability judge 131 uses the characteristic quantity calculation data to make a reliability judgments determining whether or not the extracted characteristic quantities (i.e., the values in the characteristic quantity data) are sufficiently reliable with respect to signal degradation or other factors. In step S134, the reliability data storage 132 stores (i.e., records) the judgment results in the form of reliability data.

Upon completion of the processing in step S134, the process proceeds to step S141, wherein processing related to correcting the search query characteristic quantity data on the basis of the reliability judgment results is conducted.

In step S141, the search query characteristic quantity converter 133 acquires the characteristic quantity data for the search query frame image from the search query characteristic quantity data storage 123, while additionally acquiring the reliability data corresponding to the above search query frame image from the reliability data storage 132. In step S142, the search query characteristic quantity converter 133 uses the reliability data to convert the characteristic quantity data of the search query frame image so as to obtain values having increased robustness with respect to signal degradation or other factors.

In step S143, the search query characteristic quantity conversion data storage 134 stores (i.e., records) the results of the above conversion in the form of characteristic quantity conversion data (i.e., characteristic quantity 1 conversion data, characteristic quantity 2 conversion data, . . . , and characteristic quantity N conversion data).

Upon completion of the processing in step S143, the processing proceeds to step S144, wherein processing related to correcting the search target characteristic quantity data on the basis of the reliability judgment results is conducted.

In step S144, the search target frame selector 135 determines whether or not all search target frame characteristic quantity data has been converted. If it is determined that unprocessed characteristic quantity data exists, then the process proceeds to step S145 and a search target frame is selected. In step S146, the search target characteristic quantity converter 136 acquires the characteristic quantity data for the search target frame image from the search target characteristic quantity data storage 114, while additionally acquiring the reliability data corresponding to the above search query frame image from the reliability data storage 132. In step S147, the search target characteristic quantity converter 136 uses the reliability data to convert the characteristic quantity data of the search target frame image so as to obtain values having increased robustness with respect to signal degradation or other factors.

In step S148, the search target characteristic quantity conversion data storage 137 stores (i.e., records) the conversion results in the form of characteristic quantity conversion data (i.e., characteristic quantity 1 conversion data, characteristic quantity 2 conversion data, . . . , and characteristic quantity N conversion data). By repeatedly executing the respective processes in the above steps S144 to S148, characteristic quantity data is processed for each frame image.

If it is determined in step S144 that all search target frames have been converted, then the process proceeds to step S151, wherein the characteristic quantities of the search query and the search target are compared.

In step S151, the search target frame selector 141 determines whether or not all search target frames have been compared. If it is determined that unprocessed search target frames exist, then the process proceeds to step S152, and a search target frame is selected. In step S153, the characteristic quantity comparer 142 acquires characteristic quantity conversion data for the search query frame from the search query characteristic quantity conversion data storage 134, while additionally acquiring characteristic quantity conversion data for the search target frame from the search target characteristic quantity conversion data storage 137.

In addition, in step S154, the characteristic quantity comparer 142 compares the characteristic quantities (i.e., the values in the characteristic quantity conversion data) of the search query and the search target. In step S155, the comparison results storage 143 acquires and stores the results of the above comparison, thereby updating the currently stored comparison results. Upon completion of the processing in step S155, the process returns to step S151.

In other words, by repeatedly executing the respective processes in steps S151 to S154, the search query frame is successively compared to each search target frame. Subsequently, if it is determined in step S151 that comparison with all search target frames has been completed, the process proceeds to step S156.

In step S156, the search solution frame decision unit 144 provides search results in the form of one or more search solution frames chosen on the basis of the results of the comparisons with all search target frames. In step S157, the search solution frame decision unit 144 then determines whether or not the search solution has been refined to a single frame image. If it is determined that the search solution has not been refined to a single frame image, then the process returns to step S132, and the processing in step S132 and the steps thereafter is repeated with the above search solution frame decision results incorporated thereinto.

Subsequently, if it is determined in step S157 that the search solution frame has been refined to a single frame image, then the process proceeds to step S158. In step S158, the final output unit 145 outputs information regarding the chosen search solution frame, and the search processing is then terminated.

Thus, as described above, the search processor 102 is able to search for a search target frame that matches a search query frame.

In the foregoing, the search target characteristic quantity extraction processor 101 is described as conducting the search target characteristic quantity extraction processing independently of and prior to the search processing conducted by the search processor 102. However, it should be appreciated as obvious that the search target characteristic quantity extraction processing may be configured to be conducted at some point during the execution of the search processing described above. In such a case, the respective steps of the search target characteristic quantity extraction processing shown in FIG. 2 may be executed, for example, after the characteristic quantity calculation data is stored as a result of the processing in step S124 of the search processing. Furthermore, the process may be configured such that, if it is determined in step S101 that characteristic quantities have been extracted for all search target frames, then the process proceeds to step S131. Obviously, the search target characteristic quantity extraction processing may also be configured for execution at timings other than the above.

A more concrete example of a search like the above will now be described. Hereinafter, video data provided as the search target (i.e., the search target video data) is assumed to be the result of subjecting the video data provided as the search query (i.e., the search query video data) to processes such as noise filtering and image quality adjustment. The search target video data and the search query video data herein were thus originally identical sets of data. Furthermore, the search query frame is taken to be a single frame image from the search query video data, while the search target frames are taken to be all or a portion of the frame images in the search target video data. In other words, in the present case, the frame search device 100 specifies a desired frame image (i.e., the search query frame) from the search query video data, and then searches for individual frame images (i.e., search target frames) in the search target video data that was originally identical to the search query video data, the objective of the search being to find a search target frame image having characteristics that match (or are similar to) those of the search query frame image.

Figure 4:
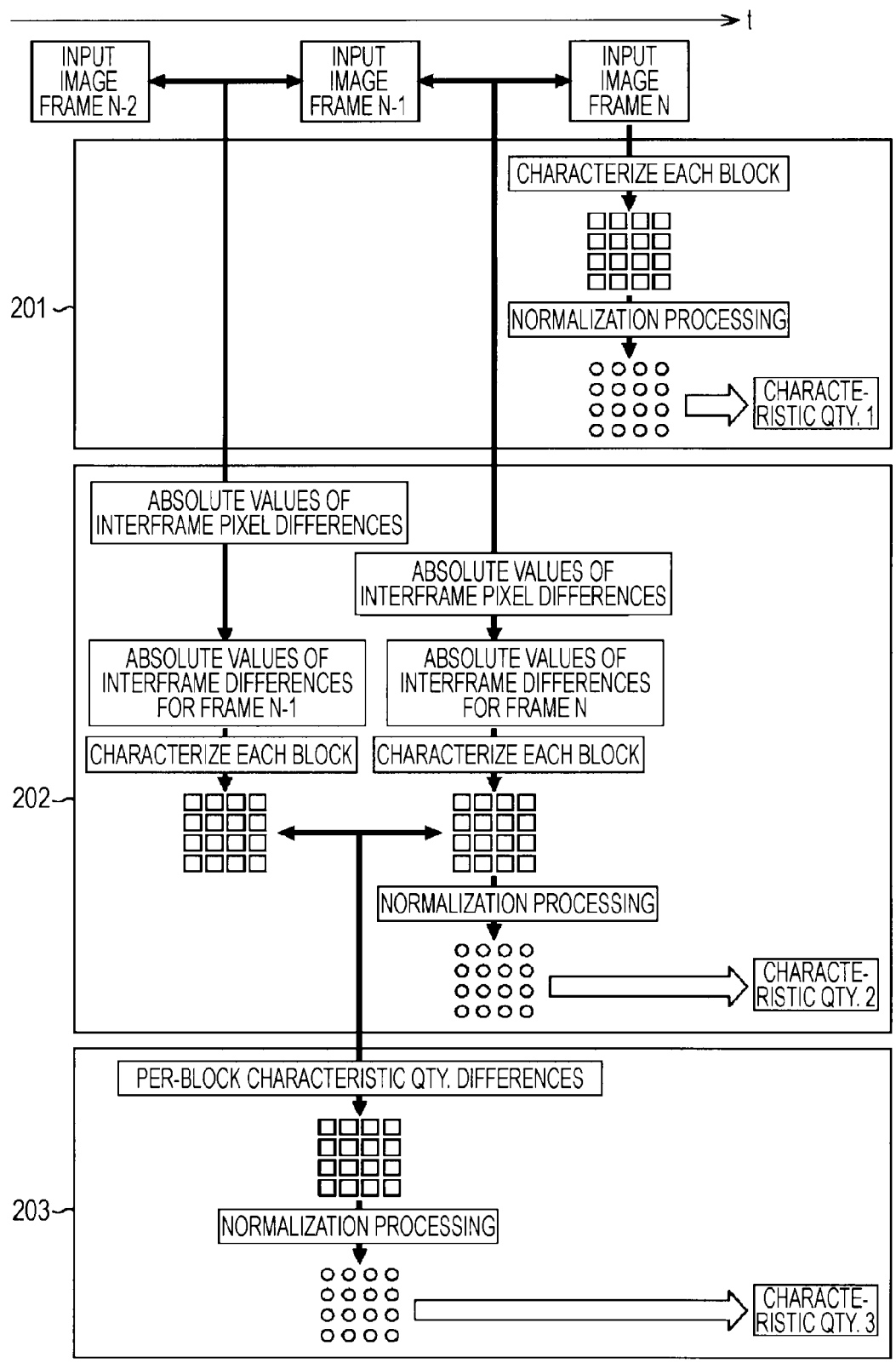
FIG. 4 is a diagram explaining, by way of example, how characteristic quantities are extracted.

First, the characteristic quantities will be described. FIG. 4 is a schematic diagram illustrating how characteristic quantities are extracted. In the present example, three different characteristic quantities (the characteristic quantities 1 to 3) are derived from a single frame image.

The characteristic quantity 1 is the set of normalized sums of brightness values (i.e., statistical values related to the pixel values) computed for each of a predetermined number of blocks into which the entirety of a first input image frame (i.e., the search query frame or a search target frame) has been divided. In other words, if it is assumed by way of example that an entire frame image has been divided into $M_1$ blocks, then the characteristic quantity 1 for the entire frame image can be expressed as a vector made up of M1 elements.

The characteristic quantity 2 is the set of normalized values, computed on a per-block basis, of the absolute values of the interframe pixel differences between the first and a second input image frame (i.e., the search query frame and an adjacent frame, or two successive search target frames). For example, the characteristic quantity 2 for the search query frame may be the set of normalized, per-block sums of the interframe pixel differences between the search query frame (i.e., an input image frame N) and the chronologically adjacent frame image immediately prior thereto (i.e., an input image frame N−1) in the search query video data. In other words, if it is assumed by way of example that an entire frame image has been divided into $M_2$ blocks, then the characteristic quantity 2 for the entire frame image can be expressed as a vector made up of $M_2$ elements.

The characteristic quantity 3 is the set of normalized differences in the pre-normalization characteristic quantities between the combined frame obtained during the computation of the characteristic quantity 2 and another frame (i.e., a third input image frame). For example, the characteristic quantity 3 for the search query frame may be the set of normalized values of the respective differences in the per-block sums of the pixel value differences between the search query frame (i.e., the input image frame N) and the immediately preceding frame image (i.e., the input image frame N−1) on the one hand, and between the frame image immediately preceding the search query frame (i.e., the input image frame N−1) and the next immediately preceding frame image (i.e., an input image frame N−2) on the other hand. In other words, if it is assumed by way of example that an entire frame image has been divided into $M_3$ blocks, then the characteristic quantity 3 for the entire frame image can be expressed as a vector made up of $M_3$ elements.

Hereinafter, frame searching that makes use of the above characteristic quantities 1 to 3 will be described. However, it should be appreciated as obvious that frame searching may be configured to use characteristic quantities other than the above characteristic quantities 1 to 3, and that the number of different characteristic quantities to be used is arbitrary. For example, although the difference values between a given frame and its immediately preceding frame are used in the characteristic quantities 2 and 3, the difference values between a given frame and its immediately succeeding frame may also be used, and likewise, the difference values between a given frame and another frame separated therefrom by several frames may also be used.

Figure 5:
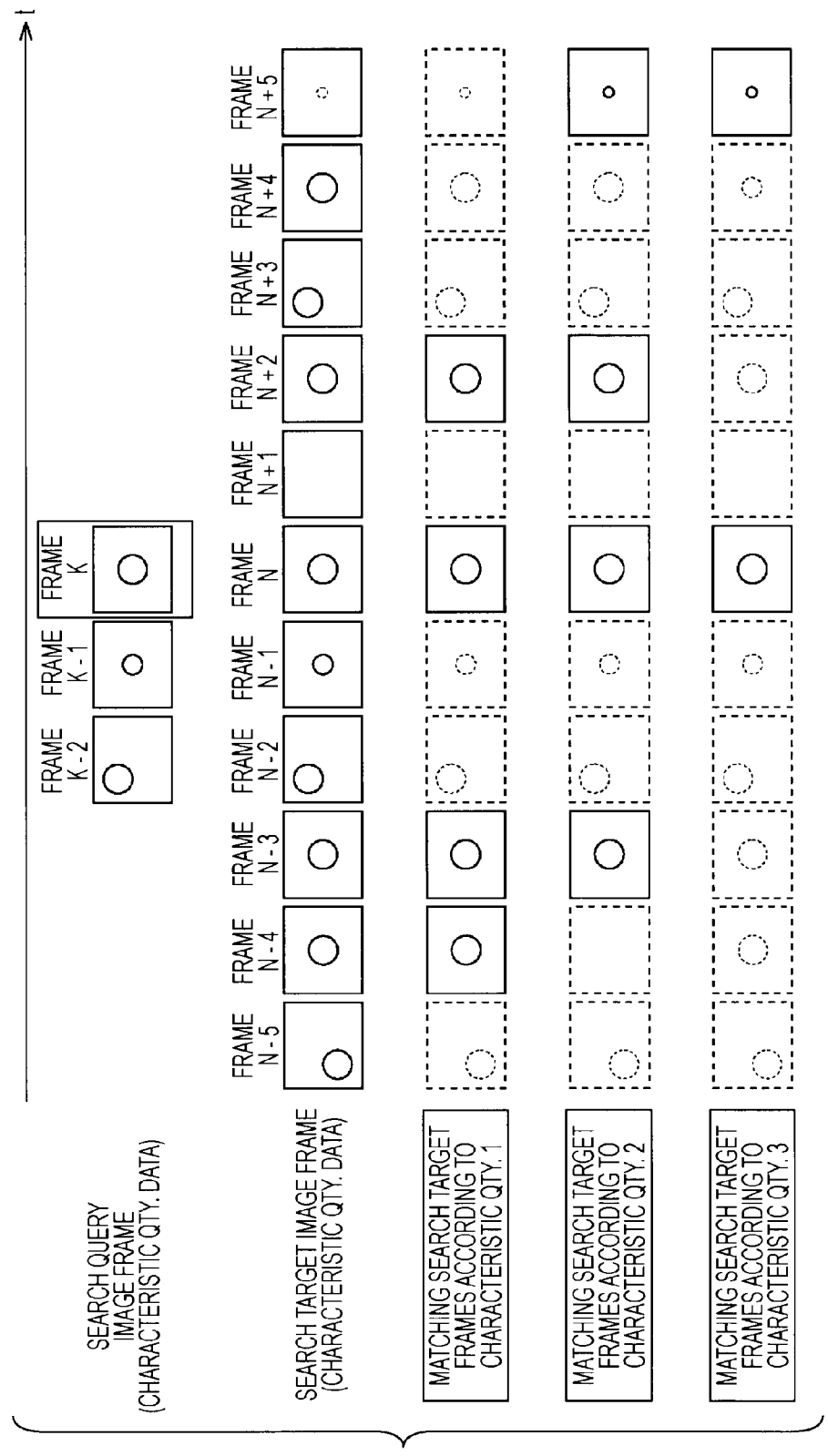
FIG. 5 is a diagram explaining, by way of example, how a frame search is conducted.

FIG. 5 illustrates an example of how a frame search is conducted using the above characteristic quantities 1 to 3. In FIG. 5, the uppermost row illustrates frame images related to the search query frame (more specifically, the characteristic quantity data thereof). The frame K enclosed by lines is the search query frame.

In addition, the second row from the top of FIG. 5 illustrates frame images of the search target frames (more specifically, the characteristic quantity data thereof). Among the search target frames, the frame N is taken to correspond to (i.e., match) the search query frame (frame K).

Although respective frames are represented as images in FIG. 5 for the sake of convenience, it is the characteristic quantity data of the respective frames that is used when comparing the search query to the search target, as described earlier.

The third row from the top of FIG. 5 illustrates the comparison results obtained using the characteristic quantity 1. The frames indicated by solid lines are frames that have been determined to match the search query frame, while the frames indicated by broken lines are frames that have been determined to not match the search query frame.

The characteristic quantity 1 expresses the characteristics of the spatial distribution pattern of brightness values in a frame image. As shown in FIG. 5, frames with a similar pattern are returned as solutions. In other words, frame N−4, frame N−3, frame N, and frame N+2 are returned as solutions, the above frames having a pattern similar to that of the search query frame (frame K), wherein a comparatively large circular object is displayed in the vicinity of the image center.

The fourth row from the top of FIG. 5 illustrates the comparison results obtained using the characteristic quantity 2. The frames indicated by solid lines are frames that have been determined to match the search query frame, while the frames indicated by broken lines are frames that have been determined to not match the search query frame.

The characteristic quantity 2 expresses the characteristics of the spatial distribution pattern of the absolute values of interframe differences in brightness. Stated differently, the characteristic quantity 2 expresses the characteristics of both the chronological distribution pattern and the spatial distribution pattern of brightness values for two frames. Consequently, matching using the characteristic quantity 2 specifies as solutions frames wherein differences appear only in the vicinity of the image center, similar to that shown in frame K and the immediately preceding frame K−1 of the search query shown in the uppermost row in FIG. 5. In other words, frame N−3, frame N, frame N+2, and frame N+5 are returned as solutions, the above frames exhibiting differences with their immediately preceding frames only in the vicinity of the image center, as shown in the fourth row from the top in FIG. 5. Note that since the characteristic quantity 2 is computed using the absolute values of the difference values as described earlier, frame N+5 (a frame wherein the circular object is smaller than that of the immediately preceding frame) is also included as a solution.

The lowermost row in FIG. 5 illustrates the comparison results obtained using the characteristic quantity 3. The frames indicated by solid lines are frames that have been determined to match the search query frame, while the frames indicated by broken lines are frames that have been determined to not match the search query frame.

The characteristic quantity 3 takes the spatial distribution patterns of the absolute values of interframe differences in brightness, and further expresses the characteristics of the time differences thereof. Stated differently, the characteristic quantity 3 expresses the characteristics of both the chronological distribution pattern and the spatial distribution pattern of brightness values for three frames. Consequently, matching using the characteristic quantity 3 specifies as solutions frames wherein the image has changed in a pattern like that of frame K−2, frame K−1, and frame K in the search query shown in the uppermost row of FIG. 5. In other words, frame N and frame N+5 are returned as solutions, the above frames being the frames among the solutions returned by the matching conducted using the characteristic quantity 2 wherein the circular object is positioned in the upper-left of the image two frames prior to the current frame, as shown in the lowermost row of FIG. 5. Note that since the absolute values of the differences values are also used in the characteristic quantity 3 as described earlier, frame N+5 (a frame wherein the circular object is smaller than that of the immediately preceding frame) is also included as a solution.

Ultimately, frame N, which satisfies all of the above three matching results, is taken as the search solution frame.

The characteristic quantity 1 is obtained by spatially dividing a frame image into blocks so as to absorb phase shifts in pixel brightness due to image degradation. In other words, the characteristic quantity 1 is a parameter used to find a pattern roughly similar to that of a given image frame. By conducting matching using the characteristic quantity 1, solutions can be refined into rough units, such as units approximating different scenes in video content that is subdivided by scene changes, or some other units equivalent to the above. In addition, by conducting matching using the characteristic quantities 2 and 3, a search is performed to find frames exhibiting similar image motion, as well as similar spatial patterns of change occurring during such motion. In other words, such matching enables finding a solution among the frame images matched using the characteristic quantity 1 with a chronological precision expressed in units of individual frames.

An exemplary process flow for characteristic quantity extraction processing using the above characteristic quantities 1 to 3 will now be described with reference to the flowchart shown in FIG. 6. It should be appreciated that the description hereinafter can be applied to both the extraction of characteristic quantities from the search query frame as well as the extraction of characteristic quantities from the search target frames. In the case of extracting characteristic quantities from the search query frame, the characteristic quantity extraction processing shown in FIG. 6 corresponds to the processing conducted in step S122 of FIG. 3. In the case of extracting characteristic quantities from the search target frames, the characteristic quantity extraction processing shown in FIG. 6 corresponds to step S104 of FIG. 2. Hereinafter, the case of extracting characteristic quantities from the search target frames will be described. Furthermore, the value of N in the search target characteristic quantity calculator 113 shown in FIG. 2 is taken to be 3, and thus the search target characteristic quantity calculator 113 is taken to include a characteristic quantity 1 calculator 113-1, a characteristic quantity 2 calculator 113-2, and a characteristic quantity 3 calculator 113-3.

Upon initiation of the characteristic quantity extraction processing, in step S201 the characteristic quantity 1 calculator 113-1 of the search target characteristic quantity calculator 113 divides an entire search target frame into a predetermined number of blocks. For example, the characteristic quantity 1 calculator 113-1 may divide an entire search target frame (more specifically, the set of brightness values thereof) into four sections vertically and four sections horizontally, thereby generating a total of 16 blocks.

In step S202, the characteristic quantity 1 calculator 113-1 respectively computes the sums of the brightness values in each block, and takes the results to be the characteristic quantity 1 for each block. At this point, the characteristic quantity 1 calculator 113-1 may also be configured to compute statistical quantities other than the per-block sums of brightness values. Since the characteristic quantity 1 expresses the spatial distribution pattern of the brightness values, any statistical information related to the brightness values on a per-block basis may be obtained.

In step S203, the characteristic quantity 1 calculator 113-1 normalizes the characteristic quantities 1 of each block. The above normalization will be described later.

In step S204, the characteristic quantity 1 calculator 113-1 defines the characteristic quantity 1 of the frame to be a vector containing the normalized characteristic quantities 1 of each block. In other words, the characteristic quantity 1 calculator 113-1 expresses the spatial distribution patterns represented by the characteristic quantities 1 of each block over the entire frame as a vector, and then takes the vector to be the characteristic quantity 1 of the frame.

After having computed the characteristic quantity 1 of the frame, in step S205 the characteristic quantity 2 calculator 113-2 computes the absolute values of interframe pixel differences between the search target frame and its immediately preceding frame. In other words, the characteristic quantity 2 calculator 113-2 computes the absolute values of the differences between the respective pixel values of pixel pairs located at identical positions in the images of the above frames.

In step S206, the characteristic quantity 2 calculator 113-2 divides the entire search target frame (more specifically, the set of absolute values of the interframe pixel differences thereof) into four sections vertically and four sections horizontally, thereby generating a total of 16 blocks. It should be appreciated that the number of such blocks is arbitrary, and may also differ from those used with respect to the characteristic quantity 1.

In step S207, the characteristic quantity 2 calculator 113-2 respectively computes the sums of the absolute values of the interframe pixel differences for each block, and takes the results to be the characteristic quantity 2 for each block. At this point, the characteristic quantity 2 calculator 113-2 may also be configured to compute statistical quantities other than the per-block sums of the absolute values of interframe pixel differences. Since the characteristic quantity 2 expresses the spatial distribution pattern of the absolute values of interframe pixel differences, any statistical information related to the absolute values of interframe pixel differences on a per-block basis may be obtained.

In step S208, the characteristic quantity 21 calculator 113-2 normalizes the characteristic quantities 2 of each block. The above normalization will be described later.

In step S209, the characteristic quantity 2 calculator 113-2 defines the characteristic quantity 2 of the frame to be a vector containing the normalized characteristic quantities 2 of each block. In other words, the characteristic quantity 2 calculator 113-2 expresses the spatial distribution patterns represented by the characteristic quantities 2 of each block over the entire frame as a vector, and then takes the vector to be the characteristic quantity 2 of the frame.

In step S210, the characteristic quantity 3 calculator 113-3 computes the absolute values of the differences in the pre-normalization characteristic quantities 2 of each block over two successive frames, and takes the results to be the characteristic quantity 3 for each block. In step S211, the characteristic quantity 3 calculator 113-3 normalizes the characteristic quantities 3 of each block. The above normalization will be described later.

In step S212, the characteristic quantity 3 calculator 113-3 defines the characteristic quantity 3 of the frame to be a vector containing the normalized characteristic quantities 3 of each block. In other words, the characteristic quantity 3 calculator 113-3 expresses the spatial distribution patterns represented by the characteristic quantities 3 of each block over the entire frame as a vector, and then takes the vector to be the characteristic quantity 3 of the frame. Subsequently, the characteristic quantity extraction processing is terminated.

Thus, as described above, the search target characteristic quantity calculator 113 is able to respectively compute the characteristic quantities 1 to 3.

An exemplary normalization method will now be described. However, it should be appreciated that the normalization method herein is arbitrary, and that any such method may be used. Moreover, the normalization methods used with respect to the individual characteristic quantities 1 to 3 may also be made to differ from one another.

Figure 7:
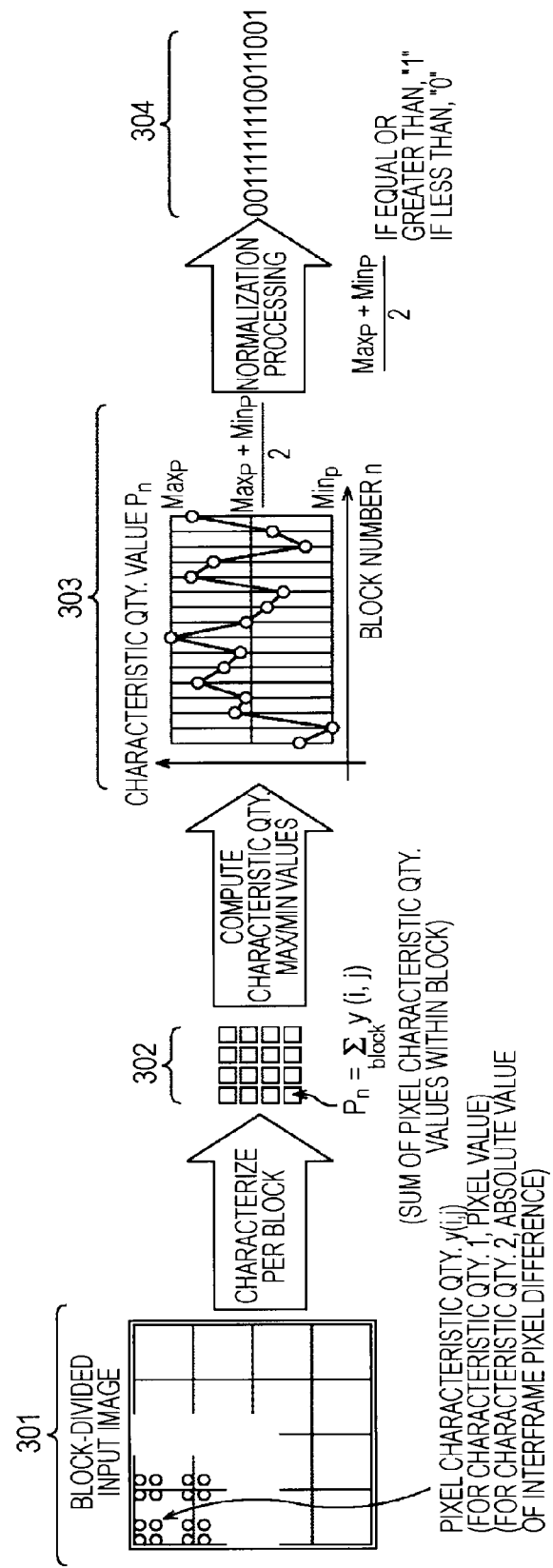
FIG. 7 is a diagram explaining, by way of example, how a characteristic quantity is normalized.

FIG. 7 is a diagram explaining, by way of example, how a characteristic quantity is normalized. As shown in the area labeled 301 in FIG. 7, the pixel-based characteristic quantities y(i,j) for the entire frame are first separated into blocks. The pixel-based characteristic quantities y(i,j) are the brightness values in the case of the characteristic quantity 1, and the absolute values of the interframe brightness differences in the case of the characteristic quantity 2. Since the characteristic quantity 3 is computed using the characteristic quantities of each block, the block division processing associated with the characteristic quantity 3 is omitted herein. In this way, the block-divided pixel characteristic quantities y(i,j) are used to derive a characteristic quantity for each block, with the per-block characteristic quantity $P_n$ (being, for example, the sum of all pixel characteristic quantities within a given block) being computed therefrom, as shown in the area labeled 302 in FIG. 7. Subsequently, as shown in the area labeled 303, the maximum value ($Max_P$) and the minimum value ($Min_P$)

among the set of values in the per-block characteristic quantity $P_n$ (i.e., the maximum and minimum values within the frame) are derived, and an intermediate value $(Max_P + Min_P)/2$ is computed. Then, as shown in the area labeled 304 in FIG. 7, values of the characteristic quantity $P_n$ that equal or exceed the intermediate value are converted to 1, while values less than the intermediate value are converted to 0. In other words, the characteristic quantity $P_n$ is normalized to the binary values 0 and 1 (i.e., binarized). A vector containing the binary values thus computed and arranged in block order is then taken to be the characteristic quantity of the frame.

Figure 8:
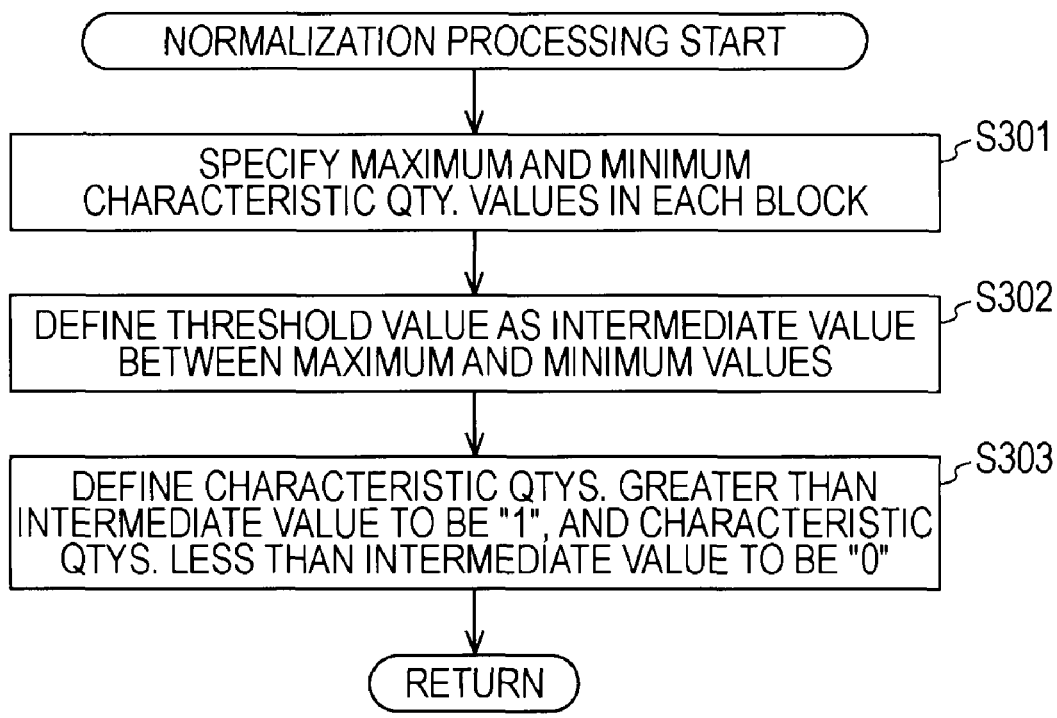
FIG. 8 is a flowchart explaining an exemplary process flow for normalization processing.

An exemplary process flow for such normalization processing will now be described with reference to the flowchart shown in FIG. 8. It should be appreciated that present normalization processing can be applied to any of the characteristic quantities 1 to 3. Hereinafter, the case of the characteristic quantity 1 (i.e., step S203 in FIG. 6) will be explained by way of example.

Figure 6:
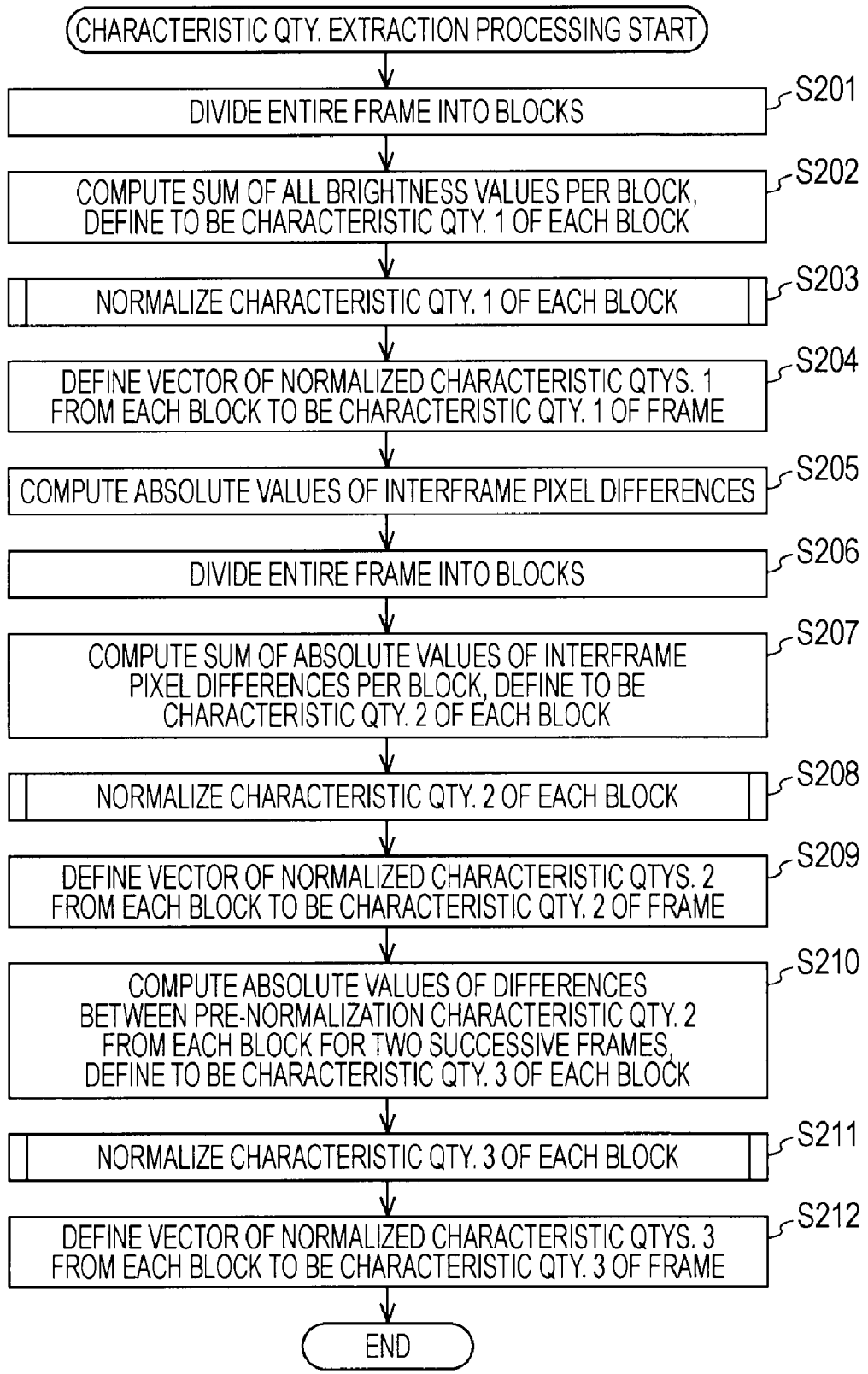
FIG. 6 is a flowchart explaining an exemplary process flow for characteristic quantity extraction processing.

Upon initiation of the normalization processing, in step S301 the characteristic quantity 1 calculator 113-1 specifies the maximum and minimum values from among the set of values for the per-block characteristic quantity 1 computed in step S202 of FIG. 6. In other words, the characteristic quantity 1 calculator 113-1 specifies the maximum and minimum values within the frame. After having solved for the maximum value and the minimum value, in step S302 the characteristic quantity 1 calculator 113-1 defines a threshold value to be an intermediate value between the maximum value and the minimum value. In step S303, the characteristic quantity 1 calculator 113-1 converts the values of the per-block characteristic quantity 1 to 1 for blocks having a value that equals or exceeds the intermediate value, and to 0 for blocks having a value less than the intermediate value.

Upon completion of the normalization of the per-block characteristic quantity 1, the characteristic quantity 1 calculator 113-1 terminates the normalization processing. The process then returns to step S203 of FIG. 6, and the processing in step S304 and thereafter is executed.

Thus, as described above, the characteristic quantity 1 calculator 113-1 is able to conduct normalization. Likewise, the per-block characteristic quantity 2 can also be normalized by causing the characteristic quantity 2 calculator 113-2 to conduct similar processing. In addition, the per-block characteristic quantity 3 can also be normalized by causing the characteristic quantity 3 calculator 113-3 to conduct similar processing. Furthermore, other per-block characteristic quantities can be computed by causing the search query characteristic quantity calculator 122 to conduct similar processing.

Reliability judgment will now be described.

Figure 9:
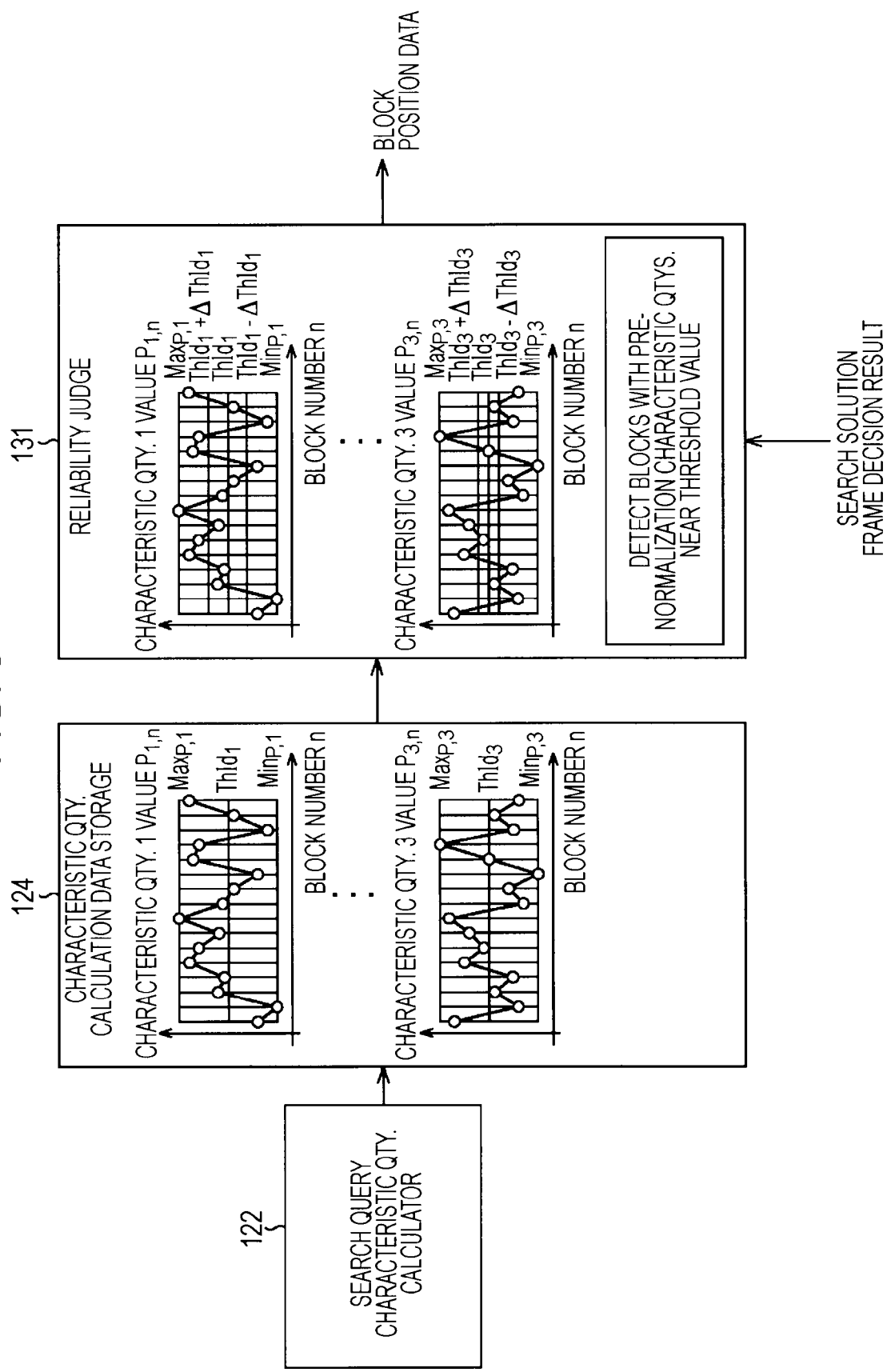
FIG. 9 is a diagram explaining, by way of example, how reliability is judged.

As shown in FIG. 9, the pre-normalization values of the per-block characteristic quantities 1 to 3 are extracted by the search query characteristic quantity calculator 122 and then stored in the characteristic quantity calculation data storage 124 as characteristic quantity calculation data. In the example shown in FIG. 9, a given frame image has been divided into n blocks. The characteristic quantity calculation data storage 124 thus stores the per-block characteristic quantity 1 $P_{1,n}$, the per-block characteristic quantity 2 $P_{2,n}$, and the per-block characteristic quantity 3 $P_{3,n}$. The values of the above characteristic quantities are then supplied to the reliability judge 131.

Given the per-block characteristic quantity 1 $P_{1,n}$, the per-block characteristic quantity 2 $P_{2,n}$, and the per-block characteristic quantity 3 $P_{3,n}$, the reliability judge 131 respectively solves for the maximum values ($Max_{P,1}$, $Max_{P,2}$, and $Max_{P,3}$) and the minimum values ($Min_{P,1}$, $Min_{P,2}$, and $Min_{P,3}$) thereof, and subsequently computes threshold values ($Thld_1$, $Thld_2$, and $Thld_3$) by taking respective intermediate values of the above (($Max_{P,1}+Min_{P,1}$)/2, ($Max_{P,2}+Min_{P,2}$)/2, and ($Max_{P,3}+Min_{P,3}$)/2)). In addition, the reliability judge 131 also solves for respective width values ($\Delta Thld_1$, $\Delta Thld_2$, and $\Delta Thld_3$), which herein act as parameters defining the respective widths of band areas centered about each threshold value. At this point, the reliability judge 131 uses the search solution frame decision results to compute respective width values. The configuration of the above width values will be described later.

The reliability judge 131 additionally identifies blocks as having a characteristic quantity value of low reliability if those blocks have characteristic quantity values that are contained in the band area indicating an area in the vicinity of the threshold value. The reliability judge 131 then outputs judgment results (i.e., reliability data) in the form of block position data that indicates the positions (or alternatively, the block numbers) of the blocks identified above.

More specifically, the reliability judge 131 detects which block positions (or alternatively, block numbers) correspond to values of the pre-normalization, per-block characteristic quantity $P_{m,n}$ that satisfy the following formula (1) with respect to the threshold value (i.e., intermediate value) $Thld_m$ used in normalization processing:

$$|P_{m,n} - Thld_m| < \Delta Thld_m \quad (1)$$

where m expresses a characteristic quantity number. In the present example, m takes one of the values 1 to 3. In addition, n is the block number used during characteristic quantity computation. The value of $\Delta Thld_m$ herein varies according to the degree of signal degradation in the corresponding signal.

Characteristic quantity comparison using the above reliability judgment results will now be described.

Figure 10:
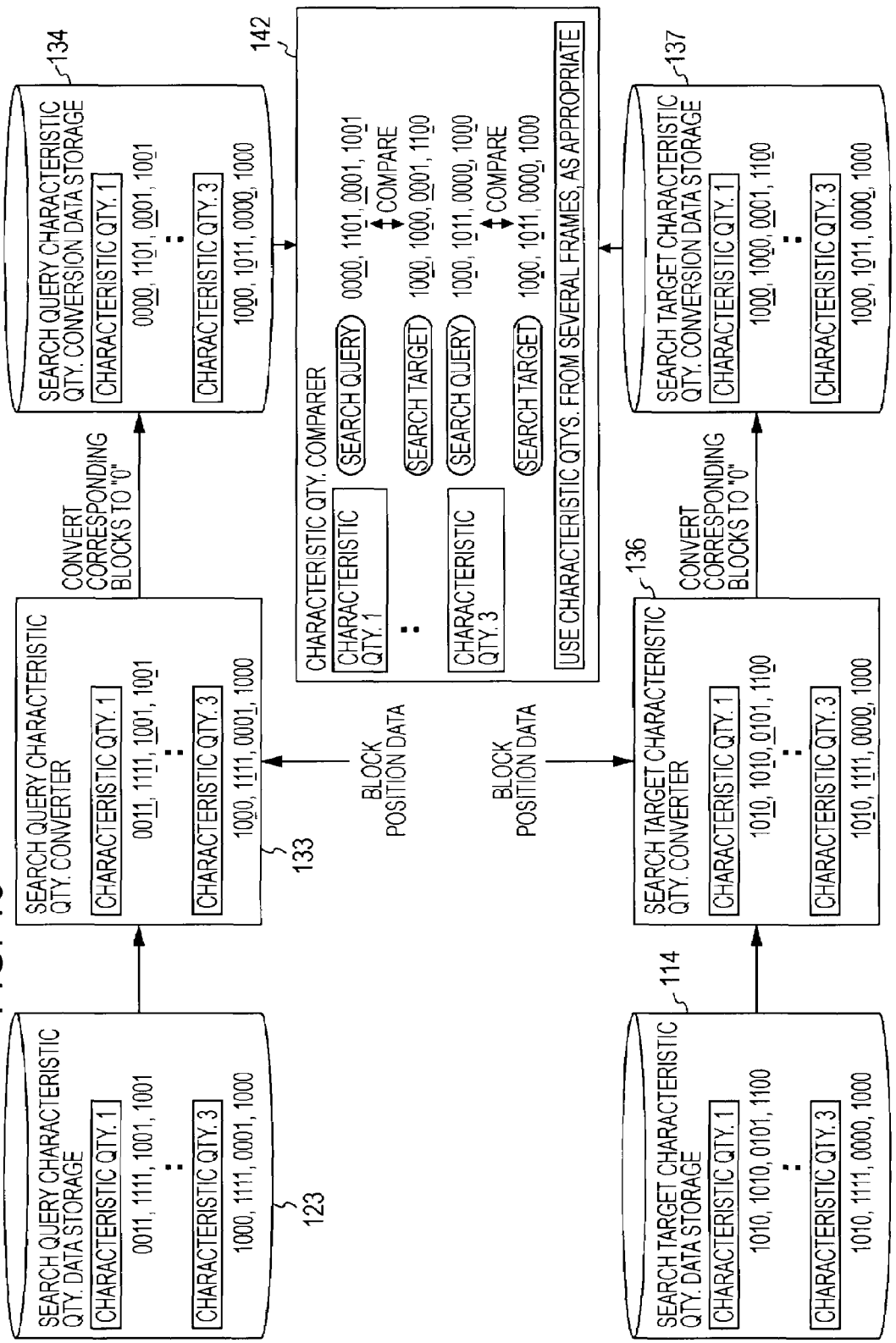
FIG. 10 is a diagram explaining, by way of example, how characteristic quantity data is converted and compared.

FIG. 10 illustrates an example of how characteristic quantities are converted and compared. As shown in FIG. 10, the respective characteristic quantities of a search query frame stored in the search query characteristic quantity data storage 123 are converted by the search query characteristic quantity converter 133 into reliability data in the form of the characteristic quantity values of blocks indicated by the block position data described earlier. In FIG. 10, the characteristic quantity 1 and the characteristic quantity 3 are shown by way of example, with the underlined values indicating the values of the blocks indicated by the block position data. The search query characteristic quantity converter 133 forcibly converts all underlined values to 0 so as to exempt such values from comparison. Consequently, the characteristic quantity 1 values (0011, 1111, 1001, 1001) are converted into the values (0000, 1101, 0001, 1001) and then stored in the search query characteristic quantity conversion data storage 134. Similarly, the characteristic quantity 3 values (1000, 1111, 0001, 1000) are converted into the values (1000, 1011, 0000, 1000) and then stored in the search query characteristic quantity conversion data storage 134.

The processing is similar for the search target, with the respective characteristic quantities of a search target frame stored in the search target characteristic quantity data storage 114 being converted by the search target characteristic quantity converter 136 into reliability data in the form of the characteristic quantity values of blocks indicated by the block position data described earlier. Likewise, the search target characteristic quantity converter 136 forcibly converts all underlined values to 0 so as to exempt such values from comparison. In the example shown in FIG. 10, the characteristic quantity 1 values (1010, 1010, 0101, 1100) are converted into the values (1000, 1000, 0001, 1100) and then stored in the search target characteristic quantity conversion data storage 137. Similarly, the characteristic quantity 3 values (1010, 1111, 0000, 1000) are converted into the values (1000, 1011, 0000, 1000) and then stored in the search target characteristic quantity conversion data storage 137.

The characteristic quantity comparer 142 then compares the converted characteristic quantities of the search query and search target obtained as described above, wherein characteristic quantities of the same type (i.e., 1, 2, or 3) are compared with each other.

Figure 11:
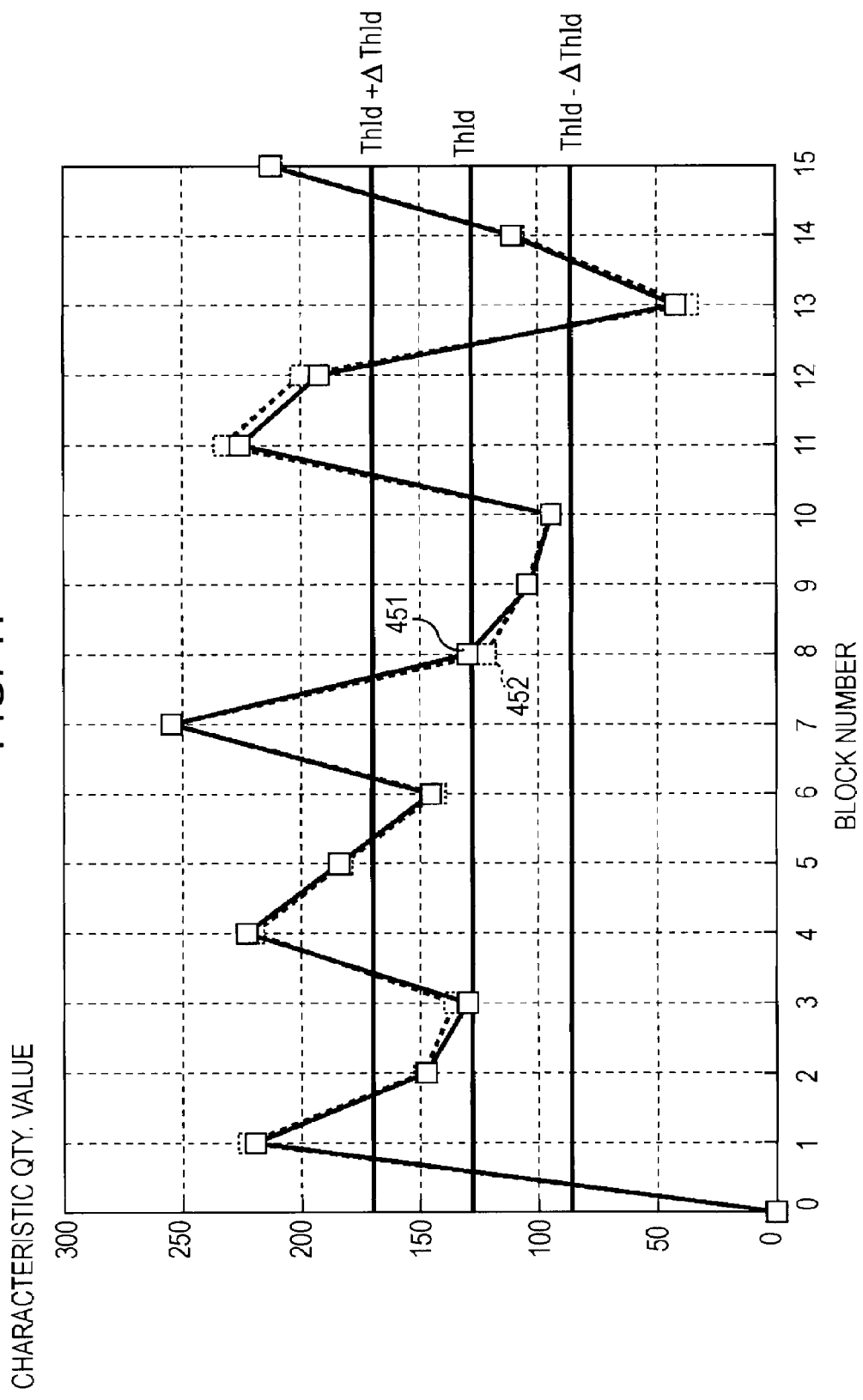
FIG. 11 is a diagram explaining a band area.

FIG. 11 illustrates an example of the results of comparing the characteristic quantity of a search query to the corresponding characteristic quantity of a search target without conducting the conversion described above. Since the search query image data and the search target image data herein were originally identical data, the values of the corresponding characteristic quantities should match over all blocks. In practice, however, the values of the characteristic quantities have changed due to signal degradation or other factors, resulting in blocks whose characteristic quantity values do not match, as shown in FIG. 11.

For example, in block number 8 shown in FIG. 11, one of the characteristic quantity values has become greater than the threshold value Thld (i.e., an intermediate value between the maximum value and the minimum value), while the other characteristic quantity value has become less than the threshold value Thld. In such a case, the normalized characteristic quantity values become different from one another. Being originally identical, the above values should match, and thus it can be concluded that the normalized values of one of the characteristic quantities has changed.

Thus, as described above, there is a high probability that normalized values in the vicinity of the threshold value will change due to signal degradation or other factors. In other words, it can be said that the data in such blocks is of low reliability. In contrast, if a block (such as block number 7 in FIG. 11, for example) is sufficiently separated from the threshold value Thld, then the probability of crossing the threshold value Thld is low, even when the characteristic quantity changes somewhat due to signal degradation or other factors. In other words, there is a low probability that the normalized values will change, and thus it can be said that the data in such blocks is of high reliability.

In consideration of the above, the reliability judge 131 sets a band area of width ($\Delta$Thld×2) and centered about the threshold value Thld, such that characteristic quantity values contained in the band area (i.e., characteristic quantity values $P_{m,n}$ satisfying the above formula (1)) are judged to be data of low reliability. Subsequently, the search query characteristic quantity converter 133 and the search target characteristic quantity converter 136 forcibly set the characteristic quantity value to 0 for blocks judged to have values of low reliability by the reliability judge 131. In so doing, such blocks are ignored during the characteristic quantity comparison conducted by the characteristic quantity comparer 142.

The characteristic quantity comparer 142 uses the converted values during the comparison of characteristic quantities, and is thereby able to unconditionally judge that the characteristic quantities of such blocks match. In other words, as a result of the above data conversion, the characteristic quantity comparer 142 in effect ignores characteristic quantities having values of low reliability, and is thereby to limit comparison to characteristic quantities having values of high reliability (i.e., characteristic quantity values $P_{m,n}$ positioned outside the band area).

The reliability judge 131 thus judges the reliability of characteristic quantity data as described above. As a result of the search query characteristic quantity converter 133 and the search target characteristic quantity converter 136 converting characteristic quantity values of low reliability into a predetermined value, the characteristic quantity comparer 142 is able to limit comparison of characteristic quantities to just the data having values of high reliability, thereby achieving comparison processing with improved robustness with respect to signal degradation and other factors. In other words, search processing robustness is improved with respect to data variance, and the frame search device 100 is able to conduct more consistent and accurate searches, even when factors such as signal degradation occur and image quality adjustments are conducted.

In the foregoing, the search query characteristic quantity converter 133 and the search target characteristic quantity converter 136 are described as converting characteristic quantity values of low reliability to 0. However, as long as the search query characteristic quantity converter 133 and the search target characteristic quantity converter 136 both conduct conversion according to the same method, the characteristic quantity values of low reliability may be converted to any value. For example, the characteristic quantity values of low reliability may also be converted to 1.

In addition, although the width of the band area is arbitrary, it can be seen from the above that the extent to which the band width is wide (i.e., the extent to which the width value $\Delta$Thld$_m$ is large) determines the extent to which the characteristic quantity comparer 142 limits comparison to data of higher reliability. Although further increasing the band width further improves search processing robustness with respect to data variance occurring as a result of factors such as noise filtering and image processing, the amount of compared data also decreases (i.e., the data resolution is reduced), thus decreasing the reliability of the search results. In other words, it is conceivable that search accuracy may be reduced in some cases. For this reason, it is preferable to set the value of the width value $\Delta$Thld$_m$ with due consideration for both search robustness and accuracy.

In addition, the characteristic quantity comparer 142 may also be configured such that if the amount of compared data is overly reduced as a result of setting the band width, then the characteristic quantity comparer 142 compares the characteristic quantities of a plurality of frame images. For example, the characteristic quantity comparer 142 may compare the characteristic quantities for four frames surrounding the search query frame. In so doing, reductions in the resolution of the compared data are suppressed, and search accuracy is maintained.

Meanwhile, if the search results are not refined to a single search solution frame, then the search is conducted again, as described with reference to the flowchart shown in FIG. 3. At this point, the reliability judge 131 adjusts the band width (i.e., the value of the width value $\Delta$Thld$_m$) on the basis of the current search solution frame decision state. The number of blocks having characteristic quantity values contained in the band area thus changes according to band width (i.e., the value of the width value $\Delta$Thld$_m$). Since characteristic quantity values contained in the band area are unconditionally judged to match in the comparisons conducted by the characteristic quantity comparer 142, the reliability judge 131 is able to adjust the number of blocks having characteristic quantity values that match (i.e., the number of matches) in the comparisons conducted by the characteristic quantity comparer 142 by adjusting the value of the width value $\Delta$Thld$_m$.

For example, the reliability judge 131 may widen the band width by increasing the value of the width value $\Delta$Thld$_m$, thereby increasing the number of matches in the comparisons conducted by the characteristic quantity comparer 142. In contrast, the reliability judge 131 may also make the band width narrower by decreasing the value of the width value $\Delta \text{Thld}_m$, thereby decreasing the number of matches in the comparisons conducted by the characteristic quantity comparer 142. On the other hand, if the characteristic quantity of a search query and the corresponding characteristic quantity of a search target exactly match over all blocks, then the values of that characteristic quantity do not change according to the value of the width value $\Delta \text{Thld}_m$. However, the present explanation primarily addresses the improvement of robustness with respect to data variance occurring due to factors such as noise filtering and image processing, and for this reason further description of the above case is omitted herein.

Based on the above, if no frames are returned as search solution frames, then the reliability judge 131 increases the value of the width value $\Delta \text{Thld}_m$ so as to widen the band width. More specifically, since there is a high probability that a search solution frame was not found due to the characteristic quantity with the fewest number of matches among the plurality of characteristic quantities, the reliability judge 131 increases the value of the width value $\Delta \text{Thld}_m$ corresponding to that particular characteristic quantity.

In addition, if a plurality of frames are returned as search solution frames, then the reliability judge 131 decreases the value of the width value $\Delta \text{Thld}_m$ so as to make the band width narrower. More specifically, since there is a high probability that the search solution frame was not refined to a single frame due to the characteristic quantity with the most number of matches among the plurality of characteristic quantities, the reliability judge 131 decreases the value of the width value $\Delta \text{Thld}_m$ corresponding to that particular characteristic quantity.

Subsequently, the search query characteristic quantity converter 133 and the search target characteristic quantity converter 136 convert the characteristic quantities on the basis of the new reliability judgment results, and the characteristic quantity comparer 142 then compares the converted characteristic quantities. The reliability judge 131 thus repeatedly conducts reliability judgments while adjusting the value of the width value $\Delta \text{Thld}_m$ as above, the search query characteristic quantity converter 133 and the search target characteristic quantity converter 136 repeatedly convert the characteristic quantities on the basis of the new reliability judgment results, and the characteristic quantity comparer 142 repeatedly compares the converted characteristic quantities until a single search solution frame is found.

By operating as described above, characteristic quantity comparison is conducted on the basis of reliability judgments having more suitable band widths. Consequently, search processing robustness is improved with respect to data variance, and the frame search device 100 is able to conduct more consistent and accurate searches, even when factors such as signal degradation occur and image quality adjustments are conducted.

However, there are limits to modifying the threshold value when increasing or decreasing the value of the width value $\Delta \text{Thld}_m$. For example, invalid or redundant results might be obtained by setting the value of the width value $\Delta \text{Thld}_m$ to 0 or less. In addition, in some cases a single search solution is not found even after repeatedly modifying the threshold value. In such cases, the reliability judge 131 forcibly terminates reliability judgment and causes the final output unit 145 to output information indicating that a search solution frame was not found.

Figure 12:
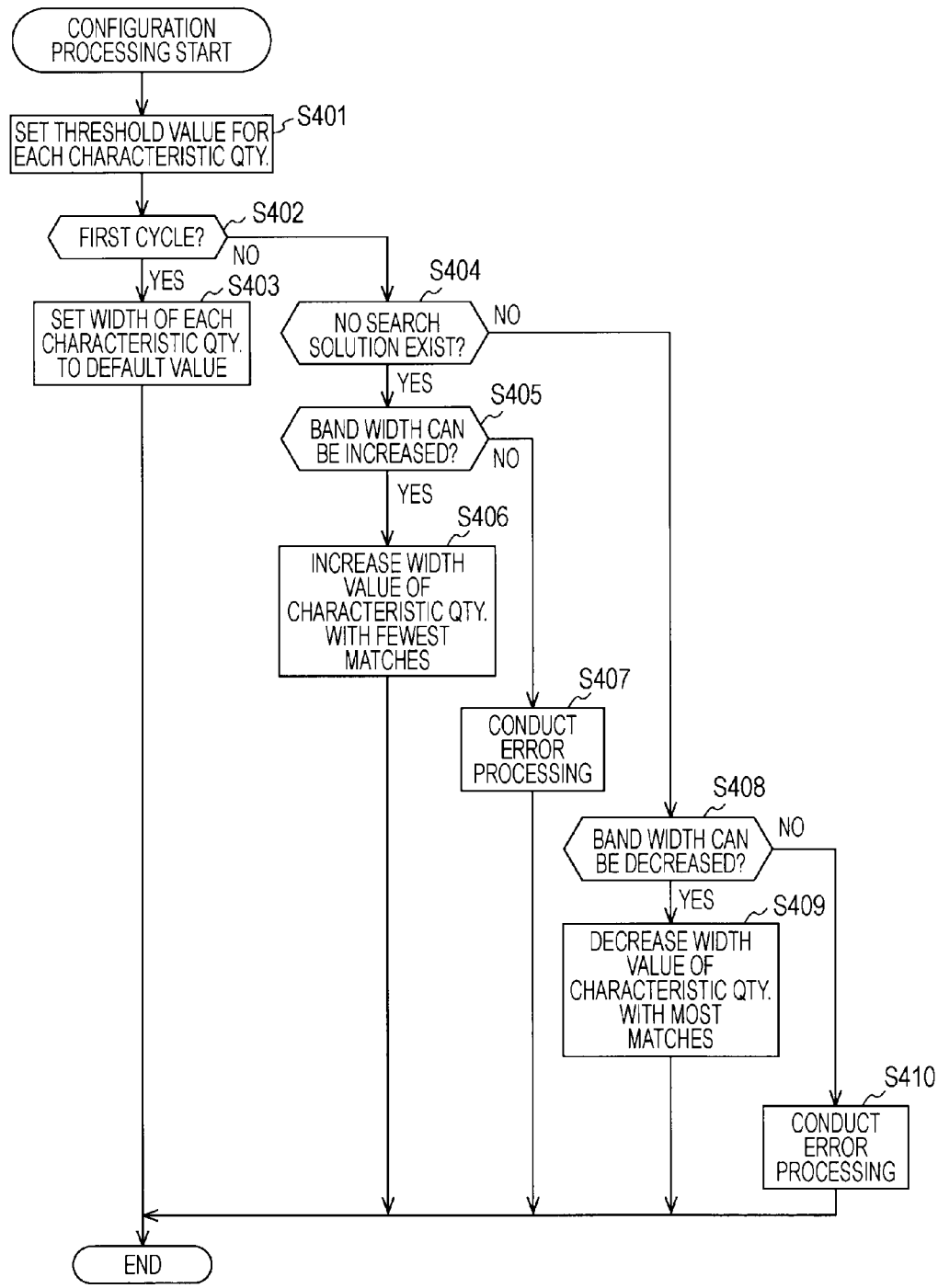
FIG. 12 is a flowchart explaining an exemplary process flow for configuration processing.

A specific example of a process flow for configuration processing like the above will now be described with reference to the flowchart shown in FIG. 12. The present configuration processing corresponds to step S132 in FIG. 3.

Upon initiation of the configuration processing, in step S401 the reliability judge 131 solves for the maximum value and the minimum value of each characteristic quantity, and then sets the threshold values $\text{Thld}_m$ therefrom. In step S402, the reliability judge 131 determines whether or not the current reliability judgment is the first reliability judgment for the current search. If the current reliability judgment is determined to be the first and that a search solution frame decision has not been made, then the process proceeds to step S403. In step S403, the reliability judge 131 sets the width value $\Delta \text{Thld}_m$ for each characteristic quantity to a predetermined default value that has been prepared in advance. The configuration processing is then terminated.

If it is determined in step S402 that the current reliability judgment is not the first and that a search solution frame decision has been made, then the process proceeds to step S404, and the reliability judge 131 determines whether or not a search solution frame exists as a result of the search solution frame decision. If it is determined that no search solution frames were found and thus that a search solution does not exist, then the process proceeds to step S405, and the reliability judge 131 determines whether or not the width of the band area can be increased. For example, the reliability judge 131 may determine whether or not changing the width of the band area will cause the upper bound of the band area to exceed the maximum value of a characteristic quantity or cause the lower bound of the band area to fall below the minimum value of a characteristic quantity. If it is determined that the width of the band area can be increased, then the process proceeds to step S406, and the reliability judge 131 increases, by a predetermined amount, the band width of the characteristic quantity having the fewest number of matches. The configuration processing is then terminated.

If it is determined in step S405 that increasing the width of the band area will cause the upper bound of the band area to equal or exceed the maximum value of a characteristic quantity or cause the lower bound of the band area to become less than or equal to the minimum value of a characteristic quantity, then the processes proceeds to step S407, and then the reliability judge 131 conducts error processing and causes the final output unit 145 to output information indicating that no frames were found for the search solution frame. The configuration processing is then terminated.

Meanwhile, if it is determined in step S404 that a plurality of search solution frames exist, then the process proceeds to step S408, and the reliability judge 131 determines whether or not the width of the band area can be decreased. For example, the reliability judge 131 may determined whether or not decreasing the width of the band area will cause that width to become less than or equal to zero. If it is determined that the width of the band area can be decreased, then the process proceeds to step S409, and the reliability judge 131 decreases, by a predetermined amount, the width value of the characteristic quantity having the most number of matches. The configuration processing is then terminated.

If it is determined in step S408 that decreasing the width of the band area will cause that width to become less than or equal to zero, then the process proceeds to step S410, and then the reliability judge 131 conducts error processing and causes the final output unit 145 to output information indicating that the search solution frame was not refined to a single frame. The configuration processing is then terminated.

The reliability judge 131 may also be configured such that, after having conducted reliability judgments a predetermined number of times, the reliability judge 131 forcibly terminates reliability judgment and then conducts error processing like that of steps S407 and S410.

By operating as described above, the reliability judge 131 is able to set the band areas to suitable widths.

The foregoing describes the case wherein an embodiment of the present invention is applied to a frame search device. However, it should be appreciated that the present invention is not limited to a frame search device, and that embodiments thereof may be applied to any type of device so long as such a device conducts frame searches as described in the foregoing.

As an operative example of the above, the case wherein an embodiment of the present invention is applied to an image processing device will be hereinafter described.

An image processing device to which an embodiment of the present invention has been applied takes images that have been recorded in advance, and then processes and displays the images according to user instructions. The image processing device also extracts characteristic quantities from an image and accumulates information regarding the processed content in association with the characteristic quantities. Furthermore, when displaying or otherwise playing back pre-recorded images, the image processing device reads the information regarding the accumulated, processed content, and then processes and displays the images.

More specifically, the operation of an image processing device 502 can be largely divided into two modes: a record mode and a playback mode.

Figure 13:
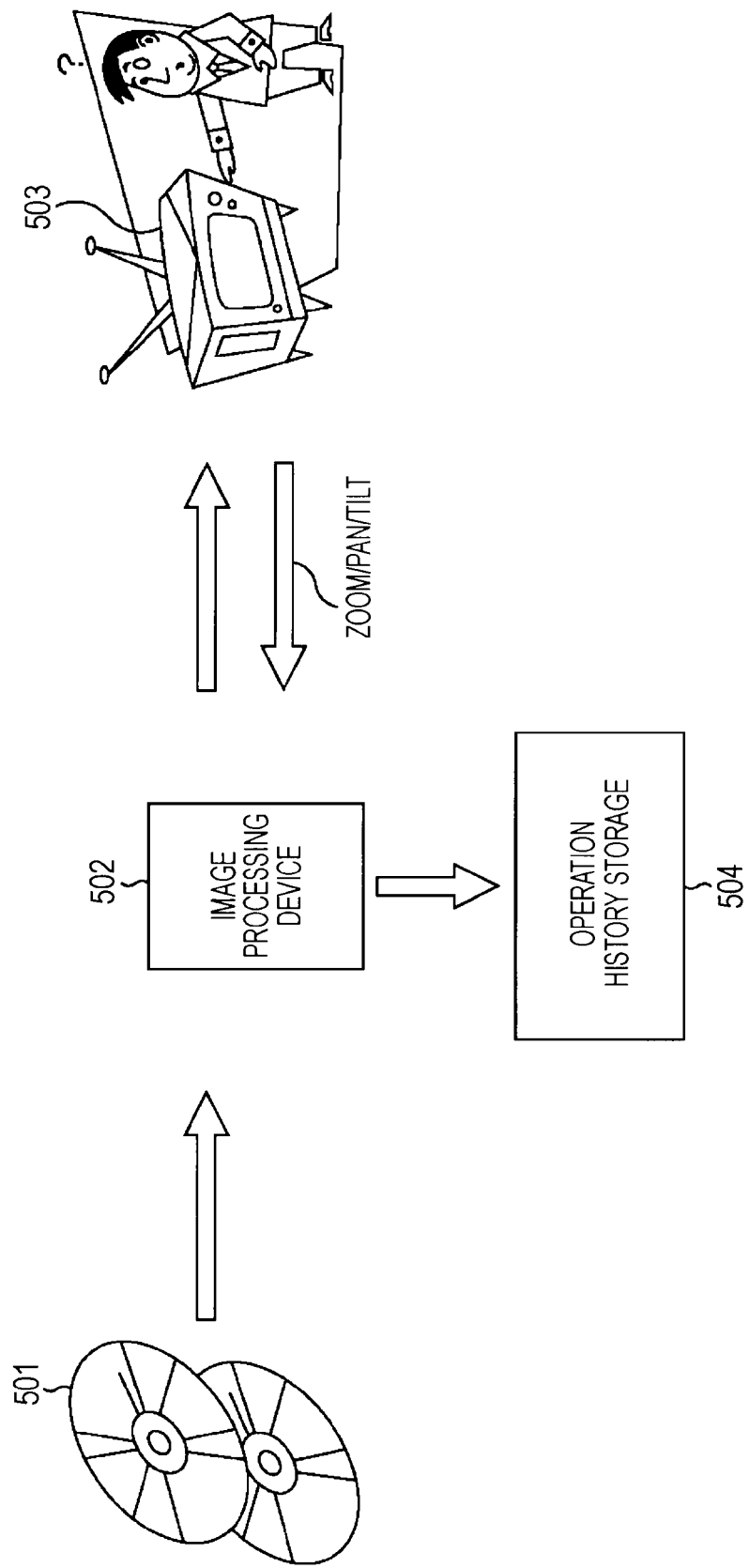
FIG. 13 is a diagram explaining the record mode of an image processing device to which an embodiment of the present invention has been applied.

As shown in FIG. 13, in record mode, the image processing device 502 may display, on a display unit 503, images played back by a DVD player or other device from a recording medium 501 such as a DVD (Digital Versatile Disc) upon which content, including video, has been recorded in advance. In this state, a remote control or similar device may be operated by a user or other person, thereby issuing instructions (such as zoom, pan, and tilt instructions) for processing to yield a desired image. Upon receiving such instructions, the image processing device 502 generates configuration information corresponding to the content of the user operation, subjects the image to processing associated with the configuration information, and then causes the results to be displayed on the display unit 503. In addition, the image processing device 502 extracts characteristic quantities from the image, and then accumulates configuration information stored in operation history storage 504 in association with the extracted characteristic quantities.

Figure 14:
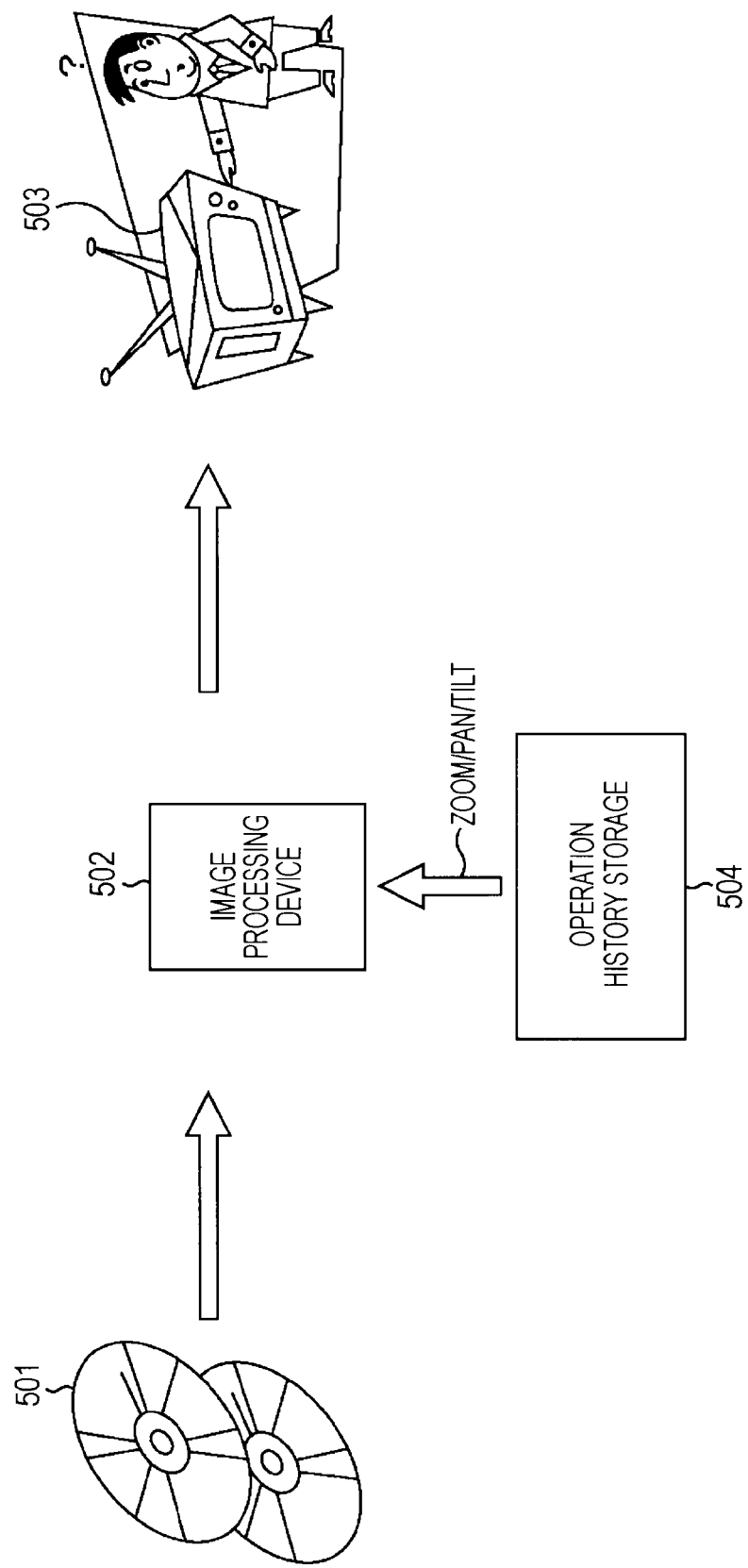
FIG. 14 is a diagram explaining the playback mode of an image processing device to which an embodiment of the present invention has been applied.

As shown in FIG. 14, in playback mode, the image processing device 502 reads an image played back by a DVD player or other device from the recording medium 501 upon which content, including video, has been recorded in advance. In addition, the image processing device 502 also extracts characteristic quantities from the read image. At this point, the image processing device 502 then reads the configuration information stored in association with the characteristic quantities in the operation history storage 504 in synchronization with the characteristic quantities of the image read from the recording medium 501. The image processing device 502 then processes the image on the basis of the read configuration information, and causes the results to be displayed on the display unit 503.

As a result of such operation, the image processing device 502 only accumulates the content of the processing conducted with respect to the pre-recorded images, and does not record the images resulting from such processing. Doing allows the images resulting from such processing to be repeatedly played back. As a result, it becomes possible to repeatedly perform various image processing with respect to images that have been previously recorded with Copy Once protection or similar limitations on the number of times the images may be duplicated.

Figure 15:
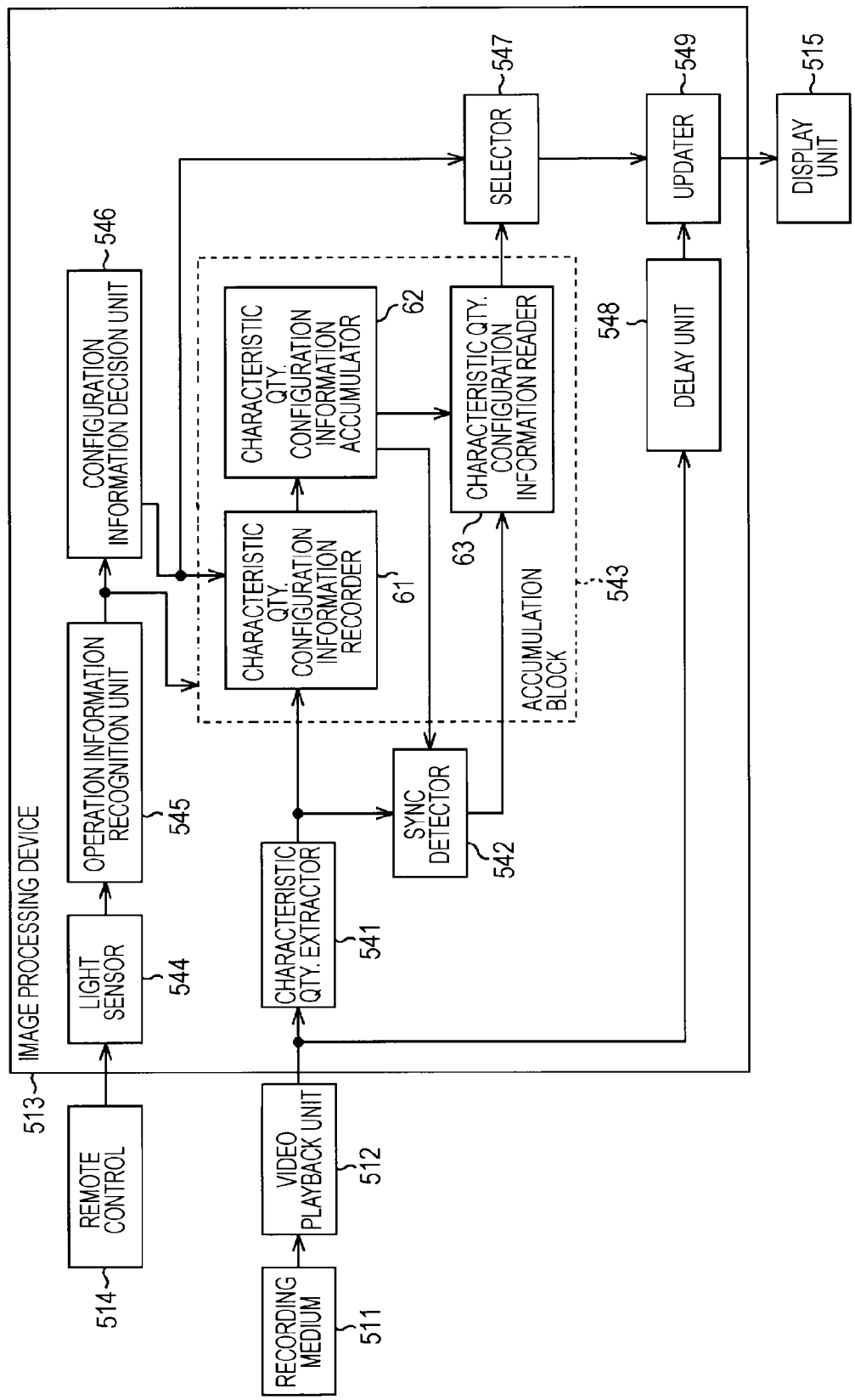
FIG. 15 is a block diagram illustrating an exemplary principal configuration of an image processing device to which an embodiment of the present invention has been applied.

FIG. 15 illustrates a configuration of an image processing device 513 in accordance with an embodiment of the present invention. The image processing device 513 herein corresponds to the image processing device 502 shown in FIGS. 13 and 14.

The video playback unit 512 decodes images that have been recorded in an encoded state according to a predetermined format onto a recording medium 511 that corresponds to the recording medium 501 shown in FIGS. 13 and 14. The video playback unit 512 then supplies the decoded images in the form of sequential images to the characteristic quantity extractor 541 and the delay unit 548.

The characteristic quantity extractor 541 extracts characteristic quantities from the images sequentially supplied thereto by the video playback unit 512. The characteristic quantity extractor 541 then supplies the extracted characteristic quantities to the sync detector 542 and the characteristic quantity configuration information recorder 561 of the accumulation block 543.

The remote control 514 includes user-operable elements such as keys and buttons. When the remote control 514 is operated by the user to issue instructions specifying particular processing to be conducted with respect to a desired image, as shown in FIGS. 13 and 14, the remote control 514 produces an operation signal in accordance with the user operations. In addition, the remote control 514 generates a light emission pattern using infrared or other light and in accordance with the produced operation signal, and then emits the light emission pattern for reception by the light sensor 544 of the image processing device 513.

The light sensor 544 converts the light emission pattern of the remote control 514 into the operation signal of the remote control 514, and then supplies the operation signal to the operation information recognition unit 545. On the basis of the operation signal supplied from the light sensor 544, the operation information recognition unit 545 recognizes operation information associated with processing to yield an image desired by the user, and then supplies the recognition results to the configuration information decision unit 546 in the form of an operation signal. Meanwhile, it is also possible to conduct control on the basis of the operation information from the remote control 514 to turn the accumulation block 543 on or off. For this reason, if the operation information recognition unit 545 recognizes operation information for turning the accumulation block 543 on or off, then the operation information recognition unit 545 conducts control to activate or deactivate the operation of the accumulation block 543.

On the basis of the operation information supplied from the operation information recognition unit 545, the configuration information decision unit 546 chooses configuration information for issuing instructions for designating specific processing to yield an image with respect to the updater 549, to be hereinafter described. The chosen configuration information is then supplied to the characteristic quantity configuration information recorder 561 and the selector 547.

The characteristic quantity configuration information recorder 561 of the accumulation block 543 causes the characteristic quantity configuration information accumulator 562 (herein corresponding to the operation history storage 504 shown in FIGS. 13 and 14) to accumulate the characteristic quantities supplied from the characteristic quantity extractor 541 in association with the configuration information supplied from the configuration information decision unit 546.

The sync detector 542 searches a particular characteristic quantity (specifically, the search position characteristic quantity, to be hereinafter described) accumulated in the characteristic quantity configuration information accumulator 562 to find the characteristic quantity (specifically, the playback position characteristic quantity, to be hereinafter described) supplied from the characteristic quantity extractor 541 and corresponding to the image currently being played back by the video playback unit 512. When an identical characteristic quantity is detected, the sync detector 542 supplies the detection results to the characteristic quantity configuration information reader 563 in the form of image sync information.

Upon acquiring the characteristic quantity (i.e., the search position characteristic quantity) detected by the sync detector 542 as a sync position, the characteristic quantity configuration information reader 563 reads the configuration information stored in the characteristic quantity configuration information accumulator 562 in association with that particular characteristic quantity, and then supplies the read configuration information to the selector 547. If the selector 547 is supplied with configuration information from the configuration information decision unit 546, then the selector 547 supplies that configuration information to the updater 549, even in the hypothetical case wherein the selector 547 is also simultaneously supplied with configuration information from the configuration information decision unit 546. On the other hand, if the selector 547 is not supplied with configuration information from the configuration information decision unit 546, and is instead supplied with configuration information from the characteristic quantity configuration information reader 563, then the selector 547 supplies the updater 549 with the configuration information that was supplied from the characteristic quantity configuration information reader 563. Furthermore, if the selector 547 is not supplied with configuration information from either of the above sources, then the selector 547 does not supply any configuration information to the updater 549.

The delay unit 548 temporarily stores an image supplied thereto from the video playback unit 512 for an amount of time equal to that elapsed during the processing conducted by the characteristic quantity extractor 541, the sync detector 542, the accumulation block 543, and the selector 547, and then subsequently outputs the image to the updater 549. If the updater 549 has been supplied with configuration information from the selector 547, then the updater 549 conducts processing to apply the configuration information and thereby update the image supplied from the delay unit 548. The updated image is then displayed by the display unit 515. If the updater 549 has not been supplied with configuration information from the selector 547, then the updater 549 causes the image supplied from the delay unit 548 to be displayed as-is by the display unit 515.

Herein, the search target video data storage 111 and the search query image frame storage 121 shown in FIG. 1 correspond to the recording medium 511 shown in FIG. 15. In addition, the search target frame selector 112, the search target characteristic quantity calculator 113, the search query characteristic quantity calculator 122, the search query characteristic quantity data storage 123, and the characteristic quantity calculation data storage 124 shown in FIG. 1 correspond to the characteristic quantity extractor 541 shown in FIG. 15. Furthermore, the search target characteristic quantity data storage 114 shown in FIG. 1 corresponds to the characteristic quantity configuration information recorder 561 and the characteristic quantity configuration information accumulator 562 shown in FIG. 15. The reliability judge 131, the reliability data storage 132, the search query characteristic quantity converter 133, the search query characteristic quantity conversion data storage 134, the search target frame selector 135, the search target characteristic quantity converter 136, the search target characteristic quantity conversion data storage 137, the search target frame selector 141, the characteristic quantity comparer 142, the comparison results storage 143, the search answer frame decision unit 144, and the final output unit 145 shown in FIG. 1 correspond to the sync detector 542 shown in FIG. 15.

In other words, during the execution of sync detection, the sync detector 542 shown in FIG. 15 is configured to conduct characteristic quantity data reliability judgments as described with reference to FIG. 1 to 12, and then compare characteristic quantities using only the characteristic quantity data having values of high reliability. In so doing, the robustness of the sync detector 542 is improved with respect to signal degradation or other factors. In other words, the image processing robustness of the image processing device 513 is improved with respect to data variance, and the image processing device 513 is able to conduct more consistent and accurate image processing, even when factors such as signal degradation occur and image quality adjustments are conducted. As a result, it becomes possible to record, play back, and edit operative data without problems.

The foregoing series of processes may be executed by means of hardware or software. In this case, an embodiment of the present invention may be realized by a personal computer like that shown in FIG. 16, for example.

Figure 16:
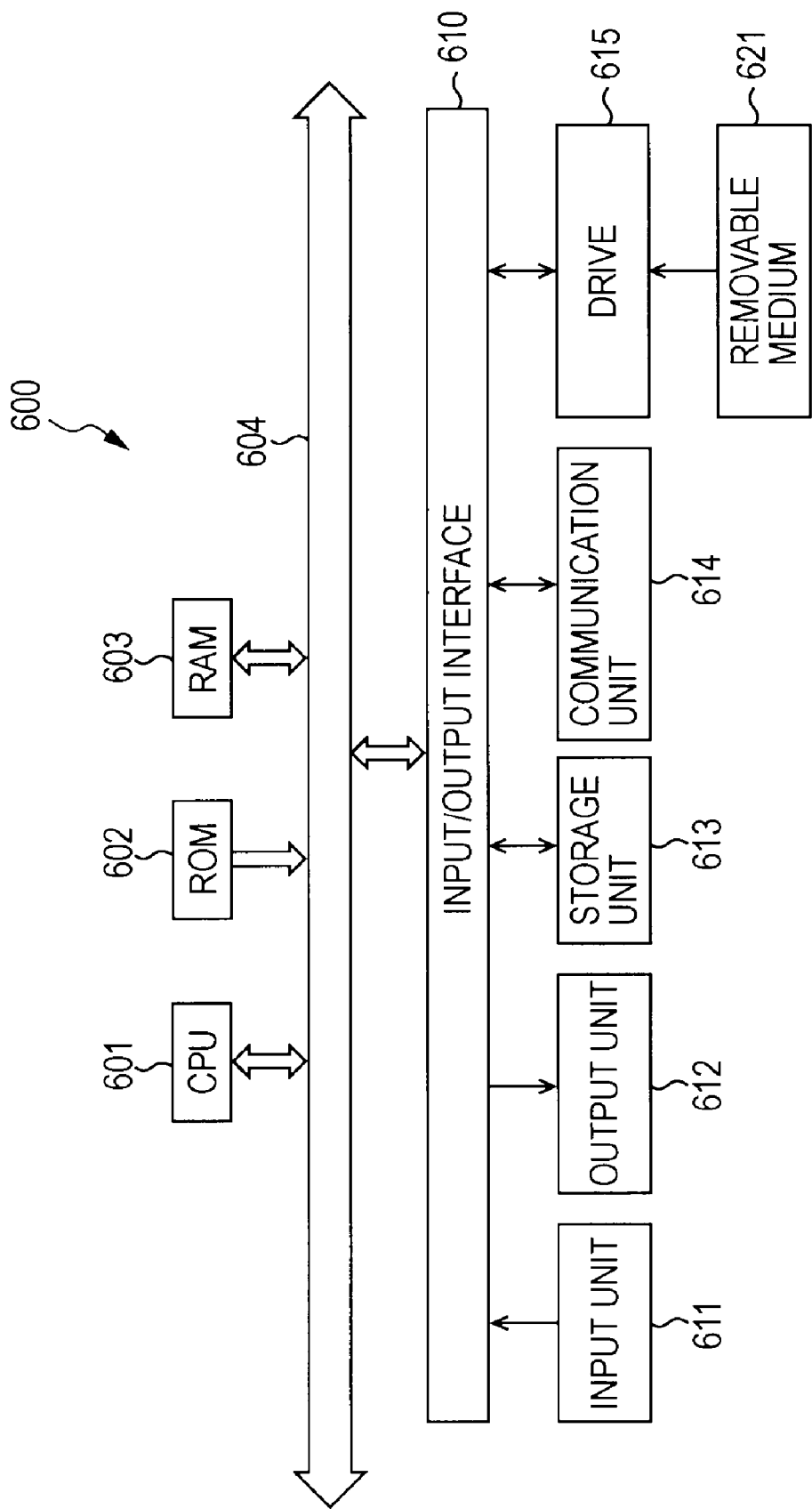
FIG. 16 is a block diagram illustrating an exemplary configuration of a personal computer to which an embodiment of the present invention has been applied.

In FIG. 16, the CPU (Central Processing Unit) 601 of a personal computer 600 executes various processing by following a program stored in ROM (Read-Only Memory) 602, or by following a program that has been loaded into RAM (Random Access Memory) 603 from a storage unit 613. The RAM 603 also stores other information as appropriate, such as data used during the execution of the various processing by the CPU 601.

The CPU 601, the ROM 602, and the RAM 603 are mutually connected via a bus 604. Also connected to the bus 604 is an input/output interface 610.

The input/output interface 610 is connected to: an input unit 611 that includes components such as a keyboard and mouse; an output unit 612 that includes components such as a CRT (Cathode Ray Tube), LCD (Liquid Crystal Display), or similar display, as well as one or more speakers; a storage unit 613 that includes components such as a hard disk; and a communication unit 614 that includes components such as a modem. The communication unit 614 conducts communication processing via networks, including the Internet.

A drive 615 may also be connected to the input/output interface 610 as appropriate. When a removable medium 621 such as a magnetic disk, optical disc, magneto-optical disk, or semiconductor memory is correctly loaded into the drive 615, one or more computer programs may be read from the removable medium 621 and installed onto the storage unit 613 as appropriate.

In the case where the foregoing series of processes are executed by means of software, the one or more programs constituting such software may be installed over a network or from a recording medium.

As shown by way of example in FIG. 16, the above recording medium may be separate from the main body of the device and realized by means of a removable medium 621 distributed in order to provide programs to one or more users. The removable medium 621 may be a magnetic disk (such as a flexible disk), an optical disc (such as a CD-ROM (Compact Disc Read-Only Memory) or DVD (Digital Versatile Disc)), a magneto-optical disk (such as an MD (MiniDisc)), or semiconductor memory upon which one or more programs have been recorded. However, the above recording medium may also be distributed to users after having been incorporated into the main body of the relevant device in advance, and may be realized by means of a component such as the ROM 602 or the hard disk included in the storage unit 613, and onto which one or more programs have been recorded.

In addition, in the present specification, the steps specified by the program recorded onto the recording medium are processed in a time series following the order described in the foregoing. However, it should be appreciated as obvious that the steps herein may also be processed in parallel or executed individually without being processed in a time series.

In the present specification, a system is taken to express the entirety of an apparatus that includes a plurality of devices therein.

The present application contains subject matter related to that disclosed in Japanese Priority Patent Application JP 2008-105502 filed in the Japan Patent Office on Apr. 15, 2008, the entire content of which is hereby incorporated by reference.

It should be appreciated that the configurations described as single devices in the foregoing may also be divided and configured as a plurality of devices. Likewise, the configurations described as a plurality of devices in the foregoing may also be integrated and configured as a single device. In addition, further embodiments of the configuration other than that described in the foregoing may of course also be added to respective devices. Furthermore, a portion of the configuration of a particular device may also be included in the configuration of another device, as long as the overall configuration and operation of the system as a whole is principally the same. Thus it should be understood that embodiments of the present invention are not limited to the embodiments described in the foregoing, and that various modifications are possible without departing from the spirit and scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   extracting means for extracting a plurality of characteristic quantities in the form of parameters that express respective characteristics of respective images, the images being a search query frame in the form of a frame image that acts as a basis for a search, and a plurality of search target frames in the form of frame images from video data that act as a target of the search;
   reliability judging means for judging a reliability of values of each characteristic quantity in a search query frame characteristic quantity group that was extracted by the extracting means;
   converting means for converting the values of the characteristic quantities in the search query frame characteristic quantity group that were judged to be values of low reliability by the reliability judging means, as well as values of the characteristic quantities in all search target frame characteristic quantity groups that correspond to the characteristic quantities judged to be values of low reliability by the reliability judging means into a same specific predetermined value;
   comparing means for comparing individual characteristic quantities in the search query frame characteristic quantity group and all search target frame characteristic quantity groups whose values were converted by the converting means; and
   deciding means for choosing, on the basis of the results of the comparisons conducted by the comparing means, a search solution frame that matches the search query frame, wherein
   the extracting means defines a characteristic quantity by normalizing values expressing a characteristic quantity of an image into binary values on the basis of a predetermined threshold value,
   the reliability judging means judges the value of the characteristic quantity to be of low reliability when the value expressing the characteristic quantity of the image before the normalization is included in a predetermined range centered about the threshold value, and
   the threshold value is defined to be an intermediate value between a maximum value and a minimum value of the values expressing the characteristic quantity of the image before the normalization.

2. The information processing apparatus according to claim 1, wherein the converting means converts, into either value of the binary value, the values of characteristic quantities in the search query frame characteristic quantity group that were judged to be values of low reliability by the reliability judging means, as well as the values of the characteristic quantities in all search target frame characteristic quantity groups that correspond to the characteristic quantities judged to be values of low reliability by the reliability judging means.

3. An information processing apparatus, comprising:
   extracting means for extracting a plurality of characteristic quantities in the form of parameters that express respective characteristics of respective images, the images being a search query frame in the form of a frame image that acts as a basis for a search, and a plurality of search target frames in the form of frame images from video data that act as a target of the search;
   reliability judging means for judging a reliability of values of each characteristic quantity in a search query frame characteristic quantity group that was extracted by the extracting means;
   converting means for converting the values of the characteristic quantities in the search query frame characteristic quantity group that were judged to be values of low reliability by the reliability judging means, as well as values of the characteristic quantities in all search target frame characteristic quantity groups that correspond to the characteristic quantities judged to be values of low reliability by the reliability judging means into a same specific predetermined value;
   comparing means for comparing individual characteristic quantities in the search query frame characteristic quantity group and all search target frame characteristic quantity groups whose values were converted by the converting means; and
   deciding means for choosing, on the basis of the results of the comparisons conducted by the comparing means, a search solution frame that matches the search query frame, wherein
   the extracting means extracts a plurality of characteristic quantity groups made up of different categories of characteristic quantities from the search query frame and all search target frames, respectively, the reliability judging means judges the reliability of the values of each characteristic quantity in each respective characteristic quantity group in the plurality of characteristic quantity groups that were extracted by the extracting means, for each respective characteristic quantity group in the plurality of characteristic quantity groups, the converting means converts the values of characteristic quantities that were judged to be values of low reliability by the reliability judging means, or alternatively, the values of all characteristic quantities that correspond to the characteristic quantities judged to have values of low reliability by the reliability judging means, the comparing means compares respective characteristic quantity groups from the plurality of characteristic quantity groups, and on the basis of the results of the comparisons of individual characteristic quantity groups conducted by the comparing means, the deciding means designates the search solution frame to be the frame that matches the search query frame in all categories.

4. The information processing apparatus according to claim 3, wherein the extracting means defines a first characteristic quantity by extracting a vector of statistical quantities related to the brightness values of each of a plurality of blocks into which an entire image has been divided, and the extracting means defines a second characteristic quantity by extracting a vector of statistical quantities related to the absolute values of the interframe differences in the brightness values for two successive frames on a per-block basis.

5. The information processing apparatus according to claim 4, wherein the extracting means defines a third characteristic quantity by additionally extracting a vector of statistical quantities related to the absolute values of the interframe differences in the statistical quantities related to the absolute values of the interframe differences in the brightness values for two successive frames on a per-block basis.

6. An information processing method, comprising:

extracting a plurality of characteristic quantities in the form of parameters that express respective characteristics of respective images, the images being a search query frame in the form of a frame image that acts as a basis for a search, and a plurality of search target frames in the form of frame images from video data that act as a target of the search;

judging reliability of values of each characteristic quantity in a search query frame characteristic quantity group that was extracted in the extracting step;

converting the values of the characteristic quantities in the search query frame characteristic quantity group that were judged to be values of low reliability in the reliability judging step, as well as values of the characteristic quantities in all search target frame characteristic quantity groups that correspond to the characteristic quantities judged to be values of low reliability in the reliability judging step into a same specific predetermined value;

comparing individual characteristic quantities in the search query frame characteristic quantity group and all search target frame characteristic quantity groups whose values were converted in the converting step; and choosing, on the basis of the results of the comparisons conducted in the comparing step, a search solution frame that matches the search query frame, wherein the step of extracting includes defining a characteristic quantity by normalizing values expressing a characteristic quantity of an image into binary values on the basis of a predetermined threshold value, the step of judging includes judging the value of the characteristic quantity to be of low reliability when the value expressing the characteristic quantity of the image before the normalization is included in a predetermined range centered about the threshold value, and the threshold value is defined to be an intermediate value between a maximum value and a minimum value of the values expressing the characteristic quantity of the image before the normalization.

7. A non-transitory computer readable medium storing thereon a program that when executed by a computer, causes the computer to perform the method of claim 6.

8. The information processing method according to claim 6, wherein the step of converting includes converting, into either value of the binary value, the values of characteristic quantities in the search query frame characteristic quantity group that were judged to be values of low reliability in the step of judging, as well as the values of the characteristic quantities in all search target frame characteristic quantity groups that correspond to the characteristic quantities judged to be values of low reliability in the step of judging.

9. An information processing apparatus, comprising:

an extractor configured to extract a plurality of characteristic quantities in the form of parameters that express respective characteristics of respective images, the images being a search query frame in the form of a frame image that acts as a basis for a search, and a plurality of search target frames in the form of frame images from video data that act as a target of the search;

a reliability judge configured to judge a reliability of values of each characteristic quantity in a search query frame characteristic quantity group that was extracted by the extractor;

a converter configured to convert the values of the characteristic quantities in the search query frame characteristic quantity group that were judged to be values of low reliability by the reliability judge, as well as values of the characteristic quantities in all search target frame characteristic quantity groups that correspond to the characteristic quantities judged to be values of low reliability by the reliability judge into a same specific predetermined value;

a comparer configured to compare individual characteristic quantities in the search query frame characteristic quantity group and all search target frame characteristic quantity groups whose values were converted by the converter; and a decision unit configured to choose, on the basis of the results of the comparisons conducted by the comparer, a search solution frame that matches the search query frame, wherein the extractor is configured to define a characteristic quantity by normalizing values expressing a characteristic quantity of an image into binary values on the basis of a predetermined threshold value, the reliability judge is configured to judge the value of the characteristic quantity to be of low reliability when the value expressing the characteristic quantity of the image before the normalization is included in a predetermined range centered about the threshold value, the threshold value is defined to be an intermediate value between a maximum value and a minimum value of the values expressing the characteristic quantity of the image before the normalization, and at least one of the extractor, the reliability judge, the converter, the comparer and the decision unit is implemented in hardware or as a hardware/software combination.

10. The information processing apparatus according to claim 9, wherein the converter is configured to convert, into either value of the binary value, the values of characteristic quantities in the search query frame characteristic quantity group that were judged to be values of low reliability by the reliability judge, as well as the values of the characteristic quantities in all search target frame characteristic quantity groups that correspond to the characteristic quantities judged to be values of low reliability by the reliability judge.

11. An information processing apparatus, comprising:

an extractor configured to extract a plurality of characteristic quantities in the form of parameters that express respective characteristics of respective images, the images being a search query frame in the form of a frame image that acts as a basis for a search, and a plurality of search target frames in the form of frame images from video data that act as a target of the search;

a reliability judge configured to judge a reliability of values of each characteristic quantity in a search query frame characteristic quantity group that was extracted by the extractor;

a converter configured to convert the values of the characteristic quantities in the search query frame characteristic quantity group that were judged to be values of low reliability by the reliability judge, as well as values of the characteristic quantities in all search target frame characteristic quantity groups that correspond to the characteristic quantities judged to be values of low reliability by the reliability judge into a same specific predetermined value;

a comparer configured to compare individual characteristic quantities in the search query frame characteristic quantity group and all search target frame characteristic quantity groups whose values were converted by the converter; and a decision unit configured to choose, on the basis of the results of the comparisons conducted by the comparer, a search solution frame that matches the search query frame, wherein the extractor is configured to extract a plurality of characteristic quantity groups made up of different categories of characteristic quantities from the search query frame and all search target frames, respectively, the reliability judge is configured to judge the reliability of the values of each characteristic quantity in each respective characteristic quantity group in the plurality of characteristic quantity groups that were extracted by the extractor, for each respective characteristic quantity group in the plurality of characteristic quantity groups, the converter is configured to convert the values of characteristic quantities that were judged to be values of low reliability by the reliability judge, or alternatively, the values of all characteristic quantities that correspond to the characteristic quantities judged to have values of low reliability by the reliability judge, the comparer is configured to compare respective characteristic quantity groups from the plurality of characteristic quantity groups, on the basis of the results of the comparisons of individual characteristic quantity groups conducted by the comparer, the decision unit is configure to designate the search solution frame to be the frame that matches the search query frame in all categories, and at least one of the extractor, the reliability judge, the converter, the comparer and the decision unit is implemented in hardware or as a hardware/software combination.

12. The information processing apparatus according to claim 11, wherein the extractor is configured to extract a first characteristic quantity by extracting a vector of statistical quantities related to the brightness values of each of a plurality of blocks into which an entire image has been divided, and the extractor is configured to define a second characteristic quantity by extracting a vector of statistical quantities related to the absolute values of the interframe differences in the brightness values for two successive frames on a per-block basis.

13. The information processing apparatus according to claim 12, wherein the extractor is configured to extract a third characteristic quantity by additionally extracting a vector of statistical quantities related to the absolute values of the interframe differences in the statistical quantities related to the absolute values of the interframe differences in the brightness values for two successive frames on a per-block basis.

14. An information processing method, comprising:

extracting a plurality of characteristic quantities in the form of parameters that express respective characteristics of respective images, the images being a search query frame in the form of a frame image that acts as a basis for a search, and a plurality of search target frames in the form of frame images from video data that act as a target of the search;

judging reliability of values of each characteristic quantity in a search query frame characteristic quantity group that was extracted in the extracting step;

converting the values of the characteristic quantities in the search query frame characteristic quantity group that were judged to be values of low reliability in the reliability judging step, as well as values of the characteristic quantities in all search target frame characteristic quantity groups that correspond to the characteristic quantities judged to be values of low reliability in the reliability judging step into a same specific predetermined value;

comparing individual characteristic quantities in the search query frame characteristic quantity group and all search target frame characteristic quantity groups whose values were converted in the converting step; and choosing, on the basis of the results of the comparisons conducted in the comparing step, a search solution frame that matches the search query frame, wherein the step of extracting includes extracting a plurality of characteristic quantity groups made up of different categories of characteristic quantities from the search query frame and all search target frames, respectively, the step of judging includes judging the reliability of the values of each characteristic quantity in each respective characteristic quantity group in the plurality of characteristic quantity groups that were extracted in the step of extracting, for each respective characteristic quantity group in the plurality of characteristic quantity groups, the step of converting includes converting the values of characteristic quantities that were judged to be values of low reliability in the step of judging, or alternatively, the values of all characteristic quantities that correspond to the characteristic quantities judged to have values of low reliability in the step of judging, the step of comparing includes comparing respective characteristic quantity groups from the plurality of characteristic quantity groups, and on the basis of the results of the comparisons of individual characteristic quantity groups conducted in the step of comparing, the step of choosing includes designating the search solution frame to be the frame that matches the search query frame in all categories.

15. The information processing method according to claim 14, wherein the step of extracting includes defining a first characteristic quantity by extracting a vector of statistical quantities related to the brightness values of each of a plurality of blocks into which an entire image has been divided, and the step of extracting includes defining a second characteristic quantity by extracting a vector of statistical quantities related to the absolute values of the interframe differences in the brightness values for two successive frames on a per-block basis.

16. The information processing apparatus method to claim 15, wherein the step of extracting includes defining a third characteristic quantity by additionally extracting a vector of statistical quantities related to the absolute values of the interframe differences in the statistical quantities related to the absolute values of the interframe differences in the brightness values for two successive frames on a per-block basis.

17. A non-transitory computer readable medium storing thereon a program that when executed by a computer, causes the computer to perform the method of claim 14.

* * * * *